United States Patent
Ozturk et al.

(10) Patent No.: US 11,388,636 B2
(45) Date of Patent: Jul. 12, 2022

(54) MOBILITY ENHANCEMENTS FOR UNLICENSED OPERATION

(71) Applicant: QUALCOMM Incorporated, San Diego, CA (US)

(72) Inventors: Ozcan Ozturk, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,947

(22) Filed: Oct. 7, 2020

(65) Prior Publication Data
US 2021/0176681 A1 Jun. 10, 2021

Related U.S. Application Data

(60) Provisional application No. 62/945,021, filed on Dec. 6, 2019.

(51) Int. Cl.
| | | |
|---|---|---|
| *H04W 16/14* | (2009.01) | |
| *H04W 72/12* | (2009.01) | |
| *H04L 5/00* | (2006.01) | |
| *H04W 74/08* | (2009.01) | |
| *H04W 36/00* | (2009.01) | |
| *H04W 76/30* | (2018.01) | |

(52) U.S. Cl.
CPC . *H04W 36/00837* (2018.08); *H04W 36/0022* (2013.01); *H04W 74/0808* (2013.01); *H04W 76/30* (2018.02)

(58) Field of Classification Search
CPC ....... H04W 36/00837; H04W 36/0022; H04W 74/0808; H04W 76/18; H04W 76/30; H04B 7/18541; H04B 17/382
See application file for complete search history.

(56) References Cited

U.S. PATENT DOCUMENTS

| | | | | |
|---|---|---|---|---|
| 10,321,505 B2 * | 6/2019 | Babaei | ................ | H04L 5/0035 |
| 10,568,007 B2 * | 2/2020 | Park | ..................... | H04W 36/30 |
| 10,849,058 B2 * | 11/2020 | Lee | ......................... | H04W 4/00 |

(Continued)

FOREIGN PATENT DOCUMENTS

| | | |
|---|---|---|
| WO | WO-2020033360 A1 | 2/2020 |
| WO | 2021018742 A1 | 2/2021 |

OTHER PUBLICATIONS

3GPP TSG RAN WG1 Meeting #96 R1-1902985, Feb. 25-Mar. 1, 2019 Agenda item: 7.2.2.2.1.*

(Continued)

*Primary Examiner* — Ahmed Elallam
(74) *Attorney, Agent, or Firm* — Harrity & Harrity, LLP \ Qualcomm

(57) ABSTRACT

This disclosure provides systems, methods and apparatuses for a user equipment (UE) performing Listen Before Talk (LBT) procedures during a handover, such as during a dual active protocol stack (DAPS) handover or a conditional handover. During the handover, the UE may have a source connection with a source cell. If the source cell is unlicensed, the UE may perform LBT for a channel of the source cell. The UE may establish a target connection with a target cell before releasing the source connection with the source cell. If the target cell is unlicensed, the UE may perform LBT for a channel of the target cell.

35 Claims, 13 Drawing Sheets

(56) References Cited

U.S. PATENT DOCUMENTS

| | | | | |
|---|---|---|---|---|
| 10,863,396 | B2* | 12/2020 | Park | H04L 27/0006 |
| 10,932,177 | B2* | 2/2021 | Lunden | H04W 36/36 |
| 10,980,062 | B1* | 4/2021 | Babaei | H04W 74/0816 |
| 2013/0201959 | A1* | 8/2013 | Guo | H04W 52/40 370/331 |
| 2018/0184475 | A1* | 6/2018 | Babaei | H04W 72/082 |
| 2019/0059029 | A1* | 2/2019 | Lunden | H04W 36/30 |
| 2019/0069325 | A1 | 2/2019 | Yerramalli et al. | |
| 2019/0254047 | A1* | 8/2019 | Ahmed | H04L 47/30 |
| 2020/0053779 | A1 | 2/2020 | Jeon et al. | |
| 2020/0077319 | A1* | 3/2020 | Lunden | H04W 36/30 |
| 2020/0100284 | A1* | 3/2020 | Li | H04W 74/008 |
| 2020/0100296 | A1* | 3/2020 | Roy | H04W 72/10 |
| 2020/0154480 | A1* | 5/2020 | Jose | H04W 74/0825 |
| 2020/0196207 | A1* | 6/2020 | Zhang | H04W 16/14 |
| 2020/0196357 | A1* | 6/2020 | Park | H04W 72/0446 |
| 2020/0221495 | A1* | 7/2020 | Chen | H04W 36/305 |
| 2020/0245205 | A1* | 7/2020 | Park | H04W 36/0077 |
| 2020/0245369 | A1* | 7/2020 | Chen | H04W 36/0005 |
| 2020/0296635 | A1* | 9/2020 | Rastegardoost | H04W 36/0077 |
| 2020/0314714 | A1* | 10/2020 | Jung | H04W 36/32 |
| 2020/0314716 | A1* | 10/2020 | Kim | H04W 36/0058 |
| 2020/0314773 | A1* | 10/2020 | Hsieh | H04W 52/367 |
| 2020/0314903 | A1 | 10/2020 | Jang et al. | |
| 2020/0314913 | A1* | 10/2020 | Rastegardoost | H04W 36/0055 |
| 2021/0029768 | A1 | 1/2021 | Shih et al. | |
| 2021/0045031 | A1 | 2/2021 | Lee et al. | |
| 2021/0051556 | A1* | 2/2021 | Lin | H04W 36/0079 |
| 2021/0051715 | A1* | 2/2021 | Huang | H04W 74/0808 |
| 2021/0092653 | A1* | 3/2021 | Park | H04W 16/14 |
| 2021/0235500 | A1* | 7/2021 | Hong | H04W 76/18 |
| 2021/0352544 | A1* | 11/2021 | Chang | H04W 36/00837 |
| 2021/0352720 | A1* | 11/2021 | Babaei | H04W 76/11 |

OTHER PUBLICATIONS

Ericsson: "Connected Mode Mobility in NR-U," 3GPP Draft, 3GPP TSG-RAN WG2 #103, R2-1812371—Connected Mode Mobility in Nr-U, 3RD Generation Partnership Project (3GPP), Mobile Competence Centre, 650, Route Des Lucioles, F-06921, Sophia-Antipolis Cedex, France, vol. Ran WG2. No. Goteborg, Sweden, Aug. 20, 2018-Aug. 24, 2018, Aug. 9, 2018 (Aug. 9, 2018), XP051521973, 4 pages, Retrieved from the Internet: URL: http://www.3gpp.org/ftp/tsg%5Fran/WG2%5FRL2/TSGR2%5F103/Docs/R2%2D1812371%2Ezi p [retrieved on Aug. 9, 2018] the whole document.

Ericsson: "LBT Failure Detection and Recovery for DAPS and CHO," 3GPP Draft, 3GPP TSG-RAN WG2 #110-e, R2-2005329, 3RD Generation Partnership Project (3GPP), Mobile Competence Centre, 650, Route Des Lucioles, F-06921, Sophia-Antipolis Cedex, France, vol. RAN WG2. No. Electronic; Jun. 6, 2020-Jun. 12, 2020, May 21, 2020, (May 21, 2020), XP051888666, 5 pages, Retrieved from the Internet: URL: https://ftp.3gpp.org/tsg_ran/WG2_RL2/TSGR2_110-e/Docs/R2-2005329.zip R2-2005329—LBT failure detection and recovery for DAPS and CHO.docx [retrieved on May 21, 2020] the whole document.

Ericsson: "Mobility in NR-U," 3GPP Draft, 3GPP TSG-RAN WG2 #105bis, R2-1907848, 3RD Generation Partnership Project (3GPP), Mobile Competence Centre, 650, Route Des Lucioles, F-06921, Sophia-Antipolis Cedex, France, vol. RAN WG2. No. Xi 'an, China, Apr. 8, 2019-Apr. 12, 2019, May 13, 2019 (May 13, 2019), XP051731275, 6 pages, Retrieved from the Internet: URL: http://www.3gpp.org/ftp/Meetings%5F3GPP%5FSYNC/RAN2/Docs/R2%2D1907848%2Ezip [retrieved on May 13, 2019] the whole document.

International Search Report and Written Opinion—PCT/US2020/070632—ISA/EPO—dated Apr. 9, 2021.

Partial International Search Report—PCT/US2020/070632—ISA/EPO—dated Feb. 2, 2021.

Qualcomm Incorporated: "Handling of UL LBT Failure for DAPS and CHO," 3GPP draft, 3GPP TSG-RAN WG2 Meeting #110-e, R2-2005550, 3RD Generation Partnership Project (3GPP), Mobile Competence Centre, 650, Route Des Lucioles, F-06921, Sophia-Antipolis Cedex, France, vol. RAN WG2. No. Electronic, Jun. 1, 2020-Jun. 12, 2020, May 22, 2020 (May 22, 2020), XP051888875, 4 pages, Retrieved from the Internet: URL: https://ftp.3gpp.org/tsg_ran/WG2_RL2/TSGR2_110-e/Docs/R2-2005550.zip R2-2005550_LBT_DAPS_CHQ.docx [retrieved-on May 22, 2020] the whole document.

Spreadtrum Communications: "Consistent LBT Failure in CHO," 3GPP Draft, 3GPP TSG-RAN WG2 Meeting #110 electronic, R2-2005050, 3RD Generation Partnership Project (3GPP), Mobile Competence Centre, 650, Route Des Lucioles, F-06921, Sophia-Antipolis Cedex, France, vol. RAN WG2, No. Electronic, Jun. 1, 2020-Jun. 12, 2020, May 22, 2020 (May 22, 2020), XP051888543, 2 pages, Retrieved from the Internet: URL: https://ftp.3gpp.org/tsg_ran/WG2_RL2/TSGR2_110-e/Docs/R2-2005050.zip R2-2005050.doc [retrieved on May 22, 2020] the whole document.

Spreadtrum Communications: "Consistent LBT Failure in DAPS," 3GPP Draft, 3GPP TSG-RAN WG2 Meeting #110 electronic, R2-2005049, 3RD Generation Partnership Project (3GPP), Mobile Competence Centre, 650, Route Des Lucioles, F-06921, Sophia-Antipolis Cedex, France, vol. RAN WG2, No. Electronic, Jun. 1, 2020-Jun. 12, 2020, May 22, 2020 (May 22, 2020), XP051888542, 2 pages, Retrieved from the Internet: URL: https://ftp.3gpp.org/tsg_ran/WG2_RL2/TSGR2_110-e/Docs/R2-2005049.zip R2-2005049.doc [retrieved on May 22, 2020] the whole document.

Spreadtrum Communications: "Mobility Consideration in NR-U," 3GPP Draft, 3GPP TSG-RAN WG2 Meeting #107, R2-1909082, 3RD Generation Partnership Project (3GPP), Mobile Competence Centre, 650, Route Des Lucioles, F-06921, Sophia-Antipolis Cedex, France, vol. RAN WG2. No. Prague, Czech Republic, Aug. 26, 2019-Aug. 30, 2019, Aug. 15, 2019 (Aug. 15, 2019), XP051766892, 3 pages, Retrieved from the Internet: URL: http://www.3gpp.org/ftp/tsg_ran/WG2_RL2/TSGR2_107/Docs/R2-1909082.zip [retrieved on Aug. 15, 2019] the whole document.

ZTE: et al., "Considerations on Mobility Management for NR-U", 3GPP Draft, 3GPP TSG-RAN WG2 Meeting #101 bis, R2-1804350, Considerations on Mobility Management for NR-U, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018, (Apr. 14, 2018), XP051428098, 4 Pages, Retrieved from the Internet: URL: http://www.3gpp.org/ftp/Meeting%5F3GPP%5FSYNC/RAN2/Docs/. [retrieved on Apr. 14, 2018] the whole document.

* cited by examiner

MOBILITY ENHANCEMENTS FOR UNLICENSED OPERATION

CROSS-REFERENCE TO RELATED APPLICATION

This Patent Application claims priority to U.S. Provisional Patent Application No. 62/945,021, filed on Dec. 6, 2019, entitled "MOBILITY ENHANCEMENTS FOR UNLICENSED OPERATION," and assigned to the assignee hereof. The disclosure of the prior Application is considered part of and is incorporated by reference in this Patent Application.

TECHNICAL FIELD

Aspects of the present disclosure relate generally to wireless communication and more particularly to techniques for mobility enhancements for unlicensed operation.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

One innovative aspect of the subject matter described in this disclosure can be implemented in a method of wireless communication performed by a user equipment (UE). The method may include determining that a handover of the UE from a source cell to a target cell is triggered, where the source cell is an unlicensed source cell and performing, during the handover, Listen Before Talk (LBT) on a channel of the source cell based on the determining and until a stopping condition occurs.

In some implementations, the stopping condition includes one or more of completing a random access channel procedure at the target cell or receiving a release source message from the target cell.

In some implementations, the target cell is an unlicensed target cell, and performing LBT during the handover includes performing LBT on a channel of the target cell, based on receiving a handover command message. In some implementations, the method may include, based on detecting one or more LBT failures on a channel of the target cell, one or more of stopping the handover to the target cell, reporting the one or more LBT failures, or continuing with a connection to the source cell.

In some implementations, the method may include, based on detecting one or more LBT failures on the channel of the source cell, one or more of switching to another bandwidth part at the source cell, or transmitting a random access channel message to the target cell. In some implementations, the method may include, based on detecting one or more LBT failures on the channel of the source cell, stopping transmission and reception at the source cell. In some implementations, the method may include, based on detecting one or more LBT failures on the channel of the source cell, switching uplink data transmission to the target cell. In some implementations, the method may include based on detecting one or more LBT failures on the channel of the source cell, reporting the one or more LBT failures to the target cell.

In some implementations, the handover is a dual active protocol stack (DAPS) handover from the source cell to the target cell. In some implementations, the handover is a conditional handover from the source cell to one of the target cell or another target cell. In some implementations, the target cell is an unlicensed candidate target cell, and performing LBT during the handover includes performing LBT on a channel of the target cell and on a channel of another unlicensed candidate target cell, based on receiving a handover command message.

In some implementations, the method may include, based on detecting one or more LBT failures on the channel of the target cell, stopping conditional handover to the target cell and attempting conditional handover to the other target cell. In some implementations, the method may include, based on detecting one or more LBT failures on the channel of the target cell, one or more of switching to another bandwidth part at the target cell. In some implementations, the method may include, based on detecting one or more LBT failures on the channel of the target cell, reporting the one or more LBT failures to the source cell or to the other target cell.

In some implementations, the channel is an uplink channel. In some implementations, the channel is a downlink channel.

Another innovative aspect of the subject matter described in this disclosure can be implemented in a UE for wireless communication. The UE may include memory and one or more processors operatively coupled to the memory. The memory and the one or more processors may be configured to determine that a handover of the UE from a source cell to a target cell is triggered, where the source cell is an unlicensed source cell, and perform, during the handover, LBT on a channel of the source cell based on the determining and until a stopping condition occurs.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine that a handover of the UE from a source cell to a target cell is triggered, where the source cell is an unlicensed source cell, and perform, during the handover, LBT on a channel of the source cell based on the determining and until a stopping condition occurs.

Another innovative aspect of the subject matter described in this disclosure can be implemented in an apparatus for wireless communication. The apparatus may include means for determining that a handover of the UE from a source cell to a target cell is triggered, where the source cell is an unlicensed source cell, and means for performing, during the handover, LBT on a channel of the source cell based on the determining and until a stopping condition occurs.

One innovative aspect of the subject matter described in this disclosure can be implemented in a method of wireless communication performed by a UE. The method may include determining that a handover of the UE from a source cell to a target cell is triggered, where the target cell is an unlicensed target cell, and performing, during the handover, LBT on a channel of the target cell, based on receiving a handover command message.

In some implementations, the method may include, based on detecting one or more LBT failures on a channel of the target cell, at least one of stopping the handover to the target cell, reporting the one or more LBT failures, or continuing with a connection to the source cell. In some implementations, the handover is a DAPS handover from the source cell to the target cell.

In some implementations, the handover is a conditional handover from the source cell to one of the target cell or another target cell. In some implementations, performing LBT during the handover includes performing LBT on a channel of the target cell and on a channel of another unlicensed candidate target cell, based on receiving a handover command message.

Another innovative aspect of the subject matter described in this disclosure can be implemented in a UE for wireless communication. The UE may include memory and one or more processors operatively coupled to the memory. The memory and the one or more processors may be configured to determine that a handover of the UE from a source cell to a target cell is triggered, where the target cell is an unlicensed target cell, and perform, during the handover, LBT on a channel of the target cell, based on receiving a handover command message.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine that a handover of the UE from a source cell to a target cell is triggered, where the target cell is an unlicensed target cell, and perform, during the handover, LBT on a channel of the target cell, based on receiving a handover command message.

Another innovative aspect of the subject matter described in this disclosure can be implemented in an apparatus for wireless communication. The apparatus may include means for determining that a handover of the UE from a source cell to a target cell is triggered, where the target cell is an unlicensed target cell, and means for performing, during the handover, LBT on a channel of the target cell, based on receiving a handover command message.

One innovative aspect of the subject matter described in this disclosure can be implemented in a method of wireless communication performed by a UE. The method may include determining that a handover of the UE from a source cell to a target cell is triggered and detecting, during the handover, one or more LBT failures on a downlink channel from one or more of the source cell or the target cell.

In some implementations, detecting the one or more LBT failures includes detecting that one or more reference signals are not received from the one or more of the target cell or the source cell. In some implementations, the method may include, based on detecting the one or more LBT failures on a channel of the source cell, one or more switching to another bandwidth part at the source cell, transmitting a random access channel message to the target cell, stopping transmission and reception at the source cell, or switching uplink data transmission to the target cell. In some implementations, the method may include, based on detecting the one or more LBT failures on a channel of the target cell, one or more of stopping the handover to the target cell, reporting the one or more LBT failures, or continuing with a connection to the source cell.

Another innovative aspect of the subject matter described in this disclosure can be implemented in a UE for wireless communication. The UE may include memory and one or more processors operatively coupled to the memory. The memory and the one or more processors may be configured to determine that a handover of the UE from a source cell to a target cell is triggered and detect, during the handover, one or more LBT failures on a downlink channel from one or more of the source cell or the target cell.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine that a handover of the UE from a source cell to a target cell is triggered and detect, during the handover, one or more LBT failures on a downlink channel from one or more of the source cell or the target cell.

Another innovative aspect of the subject matter described in this disclosure can be implemented in an apparatus for wireless communication. The apparatus may include means for determining that a handover of the UE from a source cell to a target cell is triggered and means for detecting, during the handover, one or more LBT failures on a downlink channel from one or more of the source cell or the target cell.

One innovative aspect of the subject matter described in this disclosure can be implemented in a method of wireless communication performed by a UE. The method may include determining that a secondary node (SN) change of the UE is triggered and performing, during the SN change, LBT on one or more of a channel of an unlicensed source secondary cell or a channel of an unlicensed target secondary cell.

In some implementations, the method may include performing LBT during the SN change includes performing LBT on the channel of the unlicensed source secondary cell based on the determining and until a stopping condition occurs. In some implementations, the stopping condition includes one or more of completing a random access channel procedure at the unlicensed target secondary cell or receiving a release source message from the unlicensed target secondary cell. In some implementations, the method may include, based on detecting one or more LBT failures on the channel of the unlicensed source secondary cell, one or more of switching to another bandwidth part at the unlicensed source secondary cell, transmitting a random access channel message to the unlicensed target secondary cell, or reporting the one or more LBT failures to an associated primary cell.

In some implementations, performing LBT during the SN change includes performing LBT on the channel of the unlicensed target secondary cell, based on receiving an SN change message.

Another innovative aspect of the subject matter described in this disclosure can be implemented in a UE for wireless communication. The UE may include memory and one or more processors operatively coupled to the memory. The memory and the one or more processors may be configured to determine that an SN change of the UE is triggered and perform, during the SN change, LBT on one or more of a channel of an unlicensed source secondary cell or a channel of an unlicensed target secondary cell.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine that an SN change of the UE is triggered and perform, during the SN change, LBT on one or more of a channel of an unlicensed source secondary cell or a channel of an unlicensed target secondary cell.

Another innovative aspect of the subject matter described in this disclosure can be implemented in an apparatus for wireless communication. The apparatus may include means for determining that an SN change of the UE is triggered and means for performing, during the SN change, LBT on one or more of a channel of an unlicensed source secondary cell or a channel of an unlicensed target secondary cell.

Another innovative aspect of the subject matter described in this disclosure can be implemented in a method of wireless communication performed by an apparatus of a base station includes triggering a handover of a UE, receiving one or more LBT failure reports from the UE during the handover, and performing an action for the UE based on the one or more LBT failure reports.

Another innovative aspect of the subject matter described in this disclosure can be implemented in a method of wireless communication performed by an apparatus of a base station includes triggering a change of an SN of a secondary cell group, receiving one or more LBT failure reports from a UE during the change, and performing an action for the UE based on the one or more LBT failure reports.

Another innovative aspect of the subject matter described in this disclosure can be implemented in a base station for wireless communication. The base station may include memory and one or more processors operatively coupled to the memory. The memory and the one or more processors may be configured to trigger a handover of a UE, obtain, via an interface, one or more LBT failure reports from the UE during the handover, and perform an action for the UE based on the one or more LBT failure reports. In some implementations, the memory and the one or more processors may be configured to drop a source cell or a target cell for the UE.

Another innovative aspect of the subject matter described in this disclosure can be implemented in a base station for wireless communication. The base station may include memory and one or more processors operatively coupled to the memory. The memory and the one or more processors may be configured to trigger a change of an SN of a secondary cell group, obtain, via an interface, one or LBT failure reports from a UE during the change, and perform an action for the UE based on the one or more LBT failure reports. In some implementations, the memory and the one or more processors may be configured to drop a secondary cell for the UE.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to trigger a handover of a UE, receive one or more LBT failure reports from the UE during the handover, and perform an action for the UE based on the one or more LBT failure reports.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to trigger a change of an SN of a secondary cell group, receive one or more LBT failure reports from a UE during the change, and perform an action for the UE based on the one or more LBT failure reports.

In some aspects, an apparatus for wireless communication includes means for triggering a handover of a UE, means for receiving one or more LBT failure reports from the UE during the handover, and means for performing an action for the UE based on the one or more LBT failure reports.

In some aspects, an apparatus for wireless communication includes means for triggering a change of an SN of a secondary cell group, means for receiving one or more LBT failure reports from a UE during the change, and means for performing an action for the UE based on the one or more LBT failure reports.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
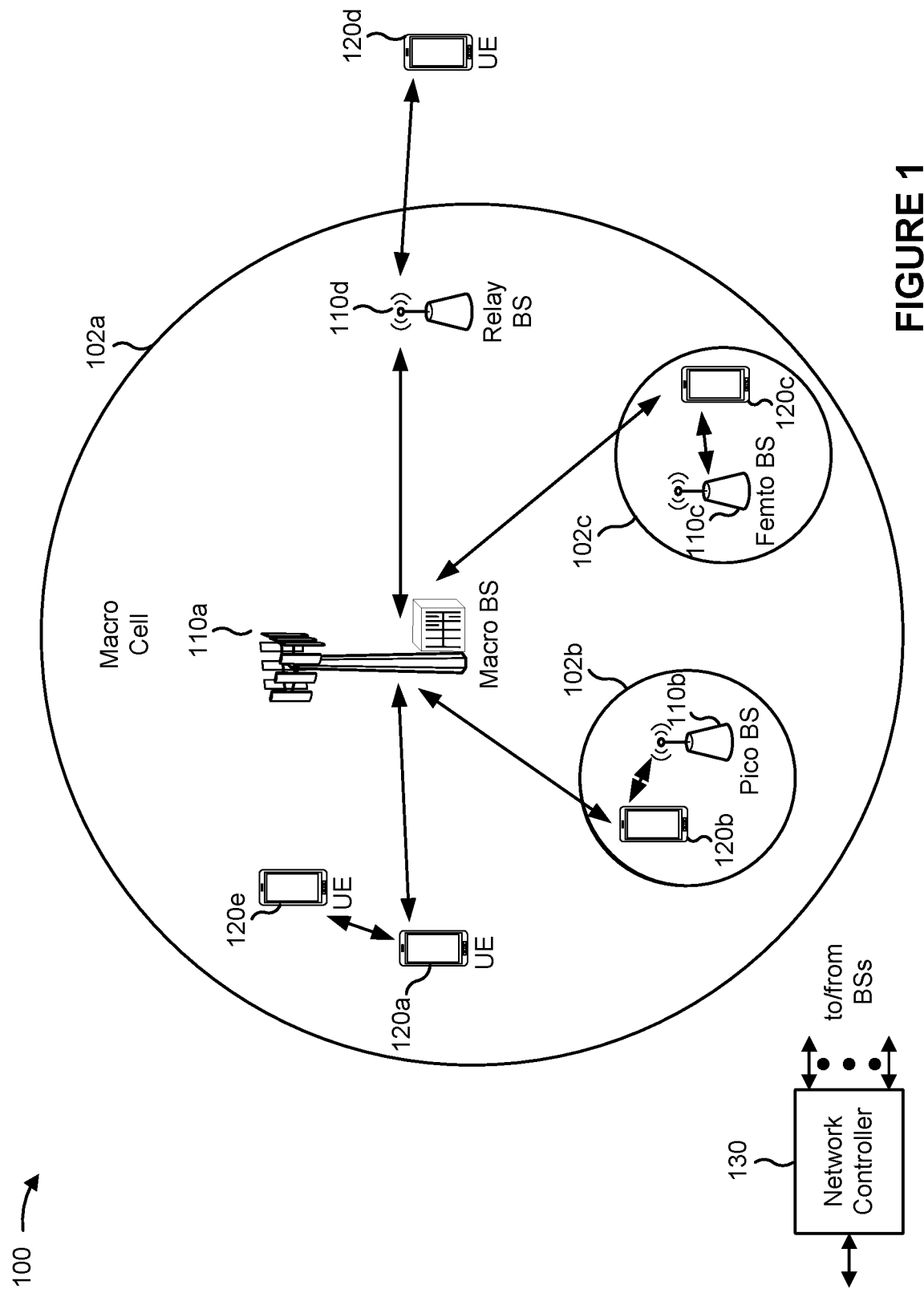
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless network may support a radio access technology and may operate on one or more frequencies, which also may be referred to as carriers or frequency channels. Some carriers for wireless communication are licensed carriers. Cellular networks, such as an LTE network or a 5G network, may use licensed carriers. Wireless local area networks, or Wi-Fi networks, may use unlicensed carriers. 5G networks may utilize License Assisted Access (LAA), which leverages unlicensed carriers in combination with licensed carriers to improve performance for UEs.

Transmissions on unlicensed carriers may require a transmitting device, such as a UE, to determine whether a carrier (frequency channel) is clear for transmission. Listen Before Talk or (listen before transmit, LBT) is a mechanism that a UE may use to sense whether a channel is clear. If a UE performs LBT on a channel and the channel is clear, this may be called an LBT success. If the UE performs LBT on the channel and the channel is not clear, this may be called an LBT failure.

UE mobility may involve a UE moving from a source cell (for example, a source base station) to a target cell (for example, a target base station). Accordingly, a connection of the UE may be moved from the source cell to the target cell with a procedure called a handover. While an interruption in service may occur when the handover is performed, enhancements to UE mobility may mitigate such interruptions. One mobility enhancement is a dual active protocol stack (DAPS) handover. DAPS handover may reduce or eliminate an interruption in service during the handover. The interruption may be reduced because a UE may keep both a source connection to the source cell and a target connection to the target cell during the handover. This type of handover may be considered a make-before-break (MBB) handover. Another mobility enhancement is a conditional handover, where the UE may identify candidate target cells and corresponding conditions that are to control when, and to which candidate target cell, the UE is to be handed over. Upon trigger of a measurement condition, the UE may complete handover to a candidate target cell that has met the corresponding conditions.

DAPS handover and conditional handover have been focused on licensed carriers. However, DAPS handover and conditional handover may expand to unlicensed carriers, because 5G networks may utilize, including simultaneously, both licensed and unlicensed carriers. With unlicensed carriers, a UE may perform LBT for uplink transmissions and transmit after LBT is successful. For unlicensed carriers, the DAPS handover process is still developing. The DAPS handover may include an unlicensed carrier, and an unlicensed carrier involves an LBT procedure to determine if a channel is clear for transmitting signals on the channel. A UE may be handed over to a target cell that may likely suffer an LBT failure and may not be able to transmit uplink signals. This will result in poor service, latency, and additional processing, and signaling resources may be used to reestablish a connection back to the source cell or to another cell.

In various aspects described herein, a UE may perform LBT during handover, such as during a DAPS handover or a conditional handover. During the handover, the UE may have a source connection with a source cell (for example, a source base station). If the source cell is unlicensed, the UE may perform LBT for a channel of the source cell (or for more than one channel). The UE may establish a target connection with a target cell (for example, a target base station) before releasing the source connection with the source cell. If the target cell is unlicensed, the UE may perform LBT for a channel of the target cell (or for more than one channel). In this way, the UE may perform LBT during a handover where there is little or no interruption in service. Depending on whether the UE detects LBT success or failures during the handover at the source cell or the target cell, the UE may take appropriate action to hand over to a target cell that may be unlicensed, cancel handover to the target cell, or choose a different target cell. Because the UE may make handover determinations during the handover, the UE may prevent completing handover to an unlicensed cell that may result in LBT failure.

Particular implementations of the subject matter described in this disclosure can be implemented to realize one or more potential advantages. For example, the UE may not suffer latency and a loss in performance as a result of a DAPS handover or a conditional handover. Processing and signaling resources may not be wasted reestablishing a connection to a cell that does not result in an LBT failure for an unlicensed cell.

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between the BS 110a and the UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

The UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). The UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
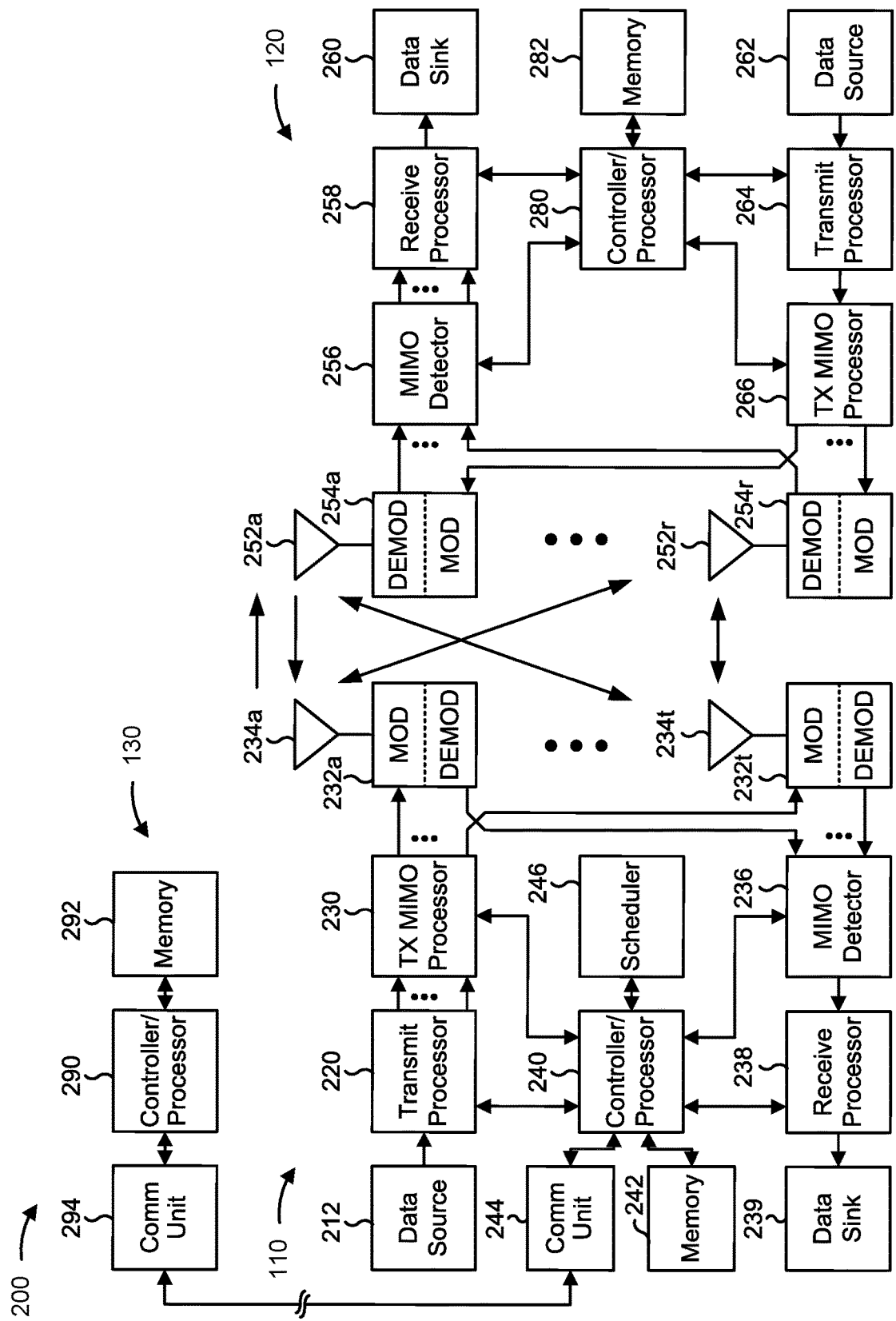
FIG. 2 is a block diagram conceptually illustrating an example of a base station in communication with a user equipment (UE) in a wireless network.

FIG. 2 is a block diagram conceptually illustrating an example 200 of a base station 110 in communication with a UE 120. In some aspects, the base station 110 and the UE 120 may respectively be one of the base stations and one of the UEs in the wireless network 100 of FIG. 1. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM, CP-OFDM, etc.), and transmitted to the base station 110. At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller or processor (i.e., controller/processor) 240. The base station 110 may include a communication unit 244 and communicate to the network controller 130 via a communication unit 244. The network controller 130 may include a communication unit 294, a controller or processor (i.e., controller/processor) 290, and a memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. The second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. The second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with mobility enhancements for unlicensed operation, as described in more detail elsewhere herein. For example, the controller/processor 240 of the base station 110, the controller/processor 280 of the UE 120, or any other component(s) (or combinations of components) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, or other processes as described herein. The memories 242 and 282 may store data and program codes for the base station 110 and the UE 120, respectively. A scheduler 246 may schedule UEs for data transmission on the downlink, the uplink, or a combination thereof.

Figure 8:
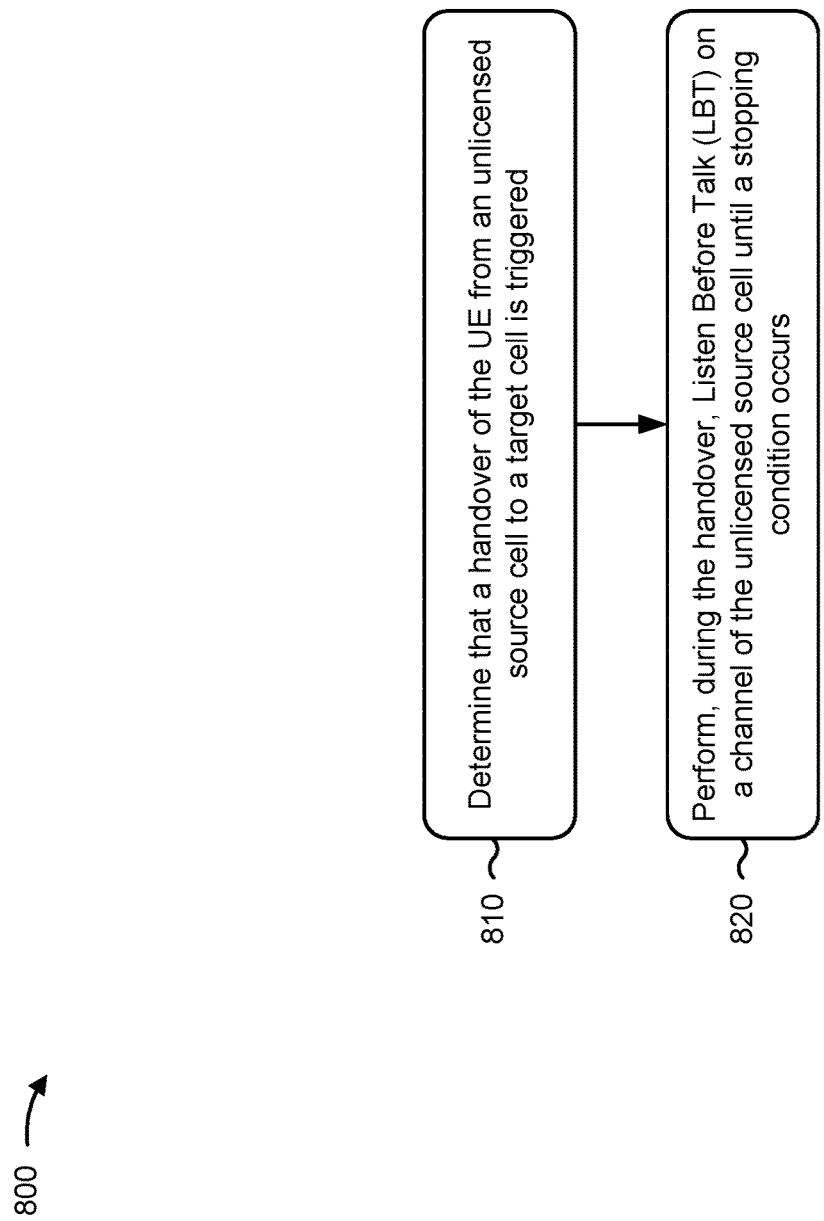
FIG. 8 is a diagram illustrating an example process performed, for example, by a UE.
Figure 9:
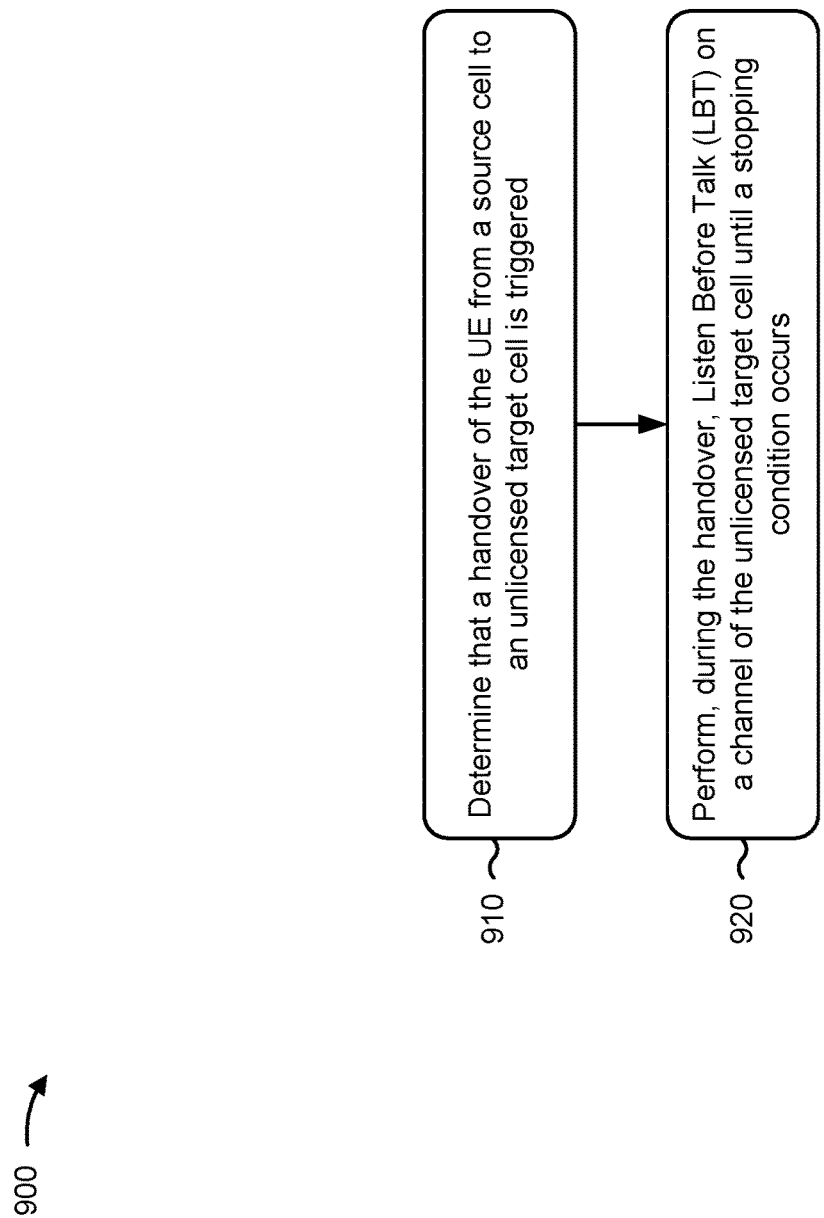
FIG. 9 is a diagram illustrating an example process performed, for example, by a UE.
Figure 10:
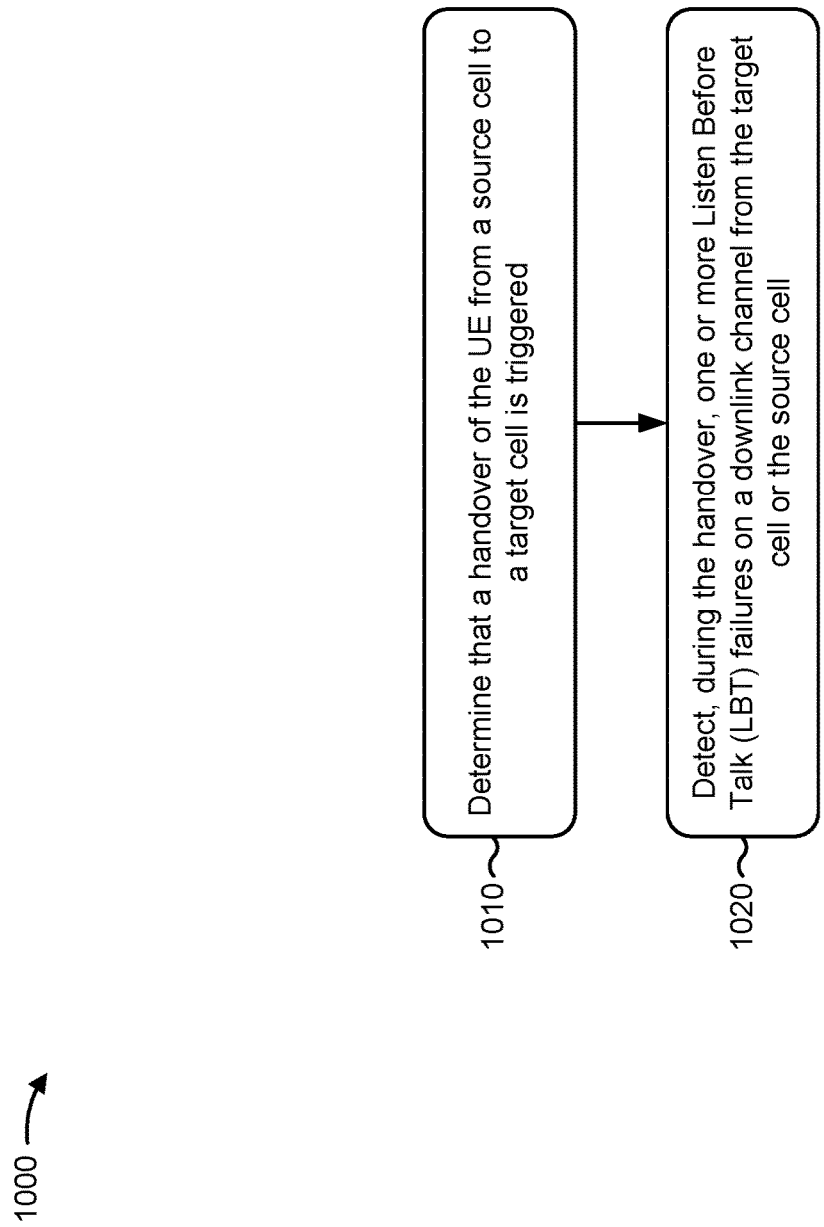
FIG. 10 is a diagram illustrating an example process performed, for example, by a UE.
Figure 11:
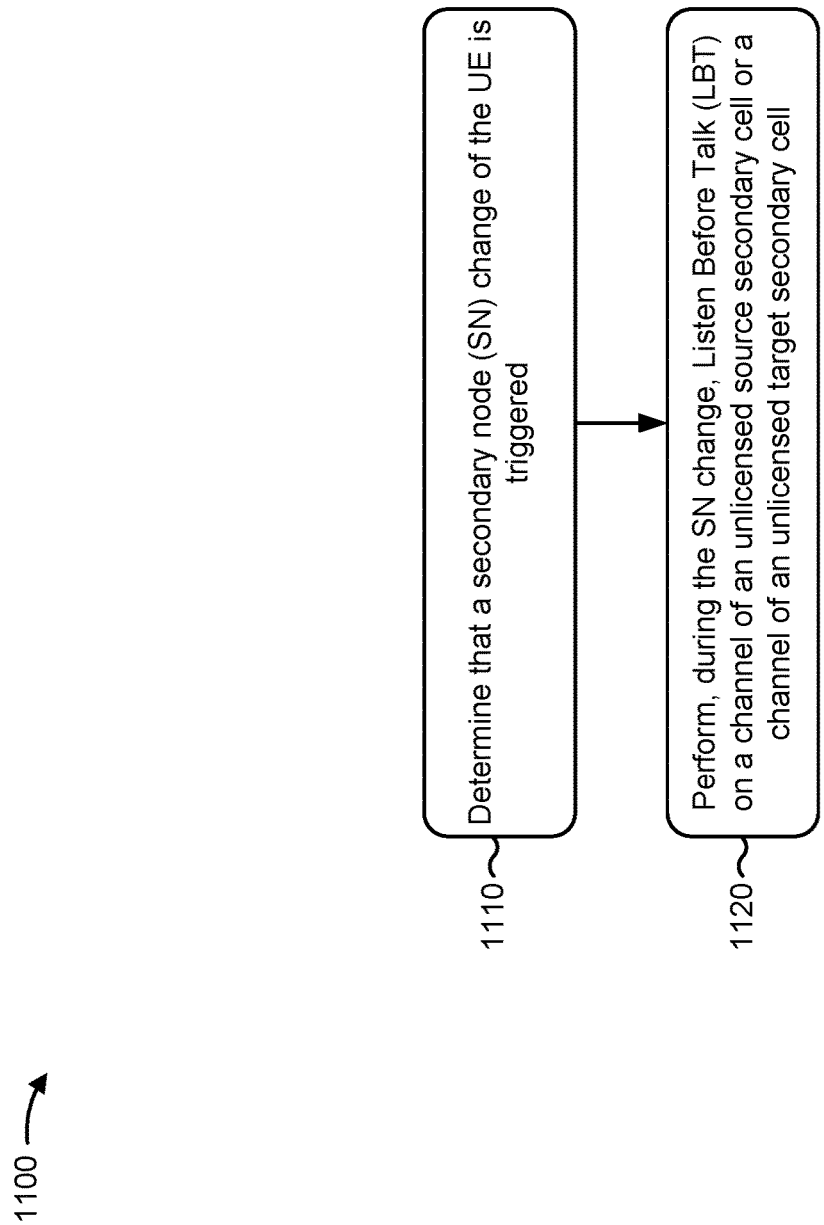
FIG. 11 is a diagram illustrating an example process performed, for example, by a UE.
Figure 12:
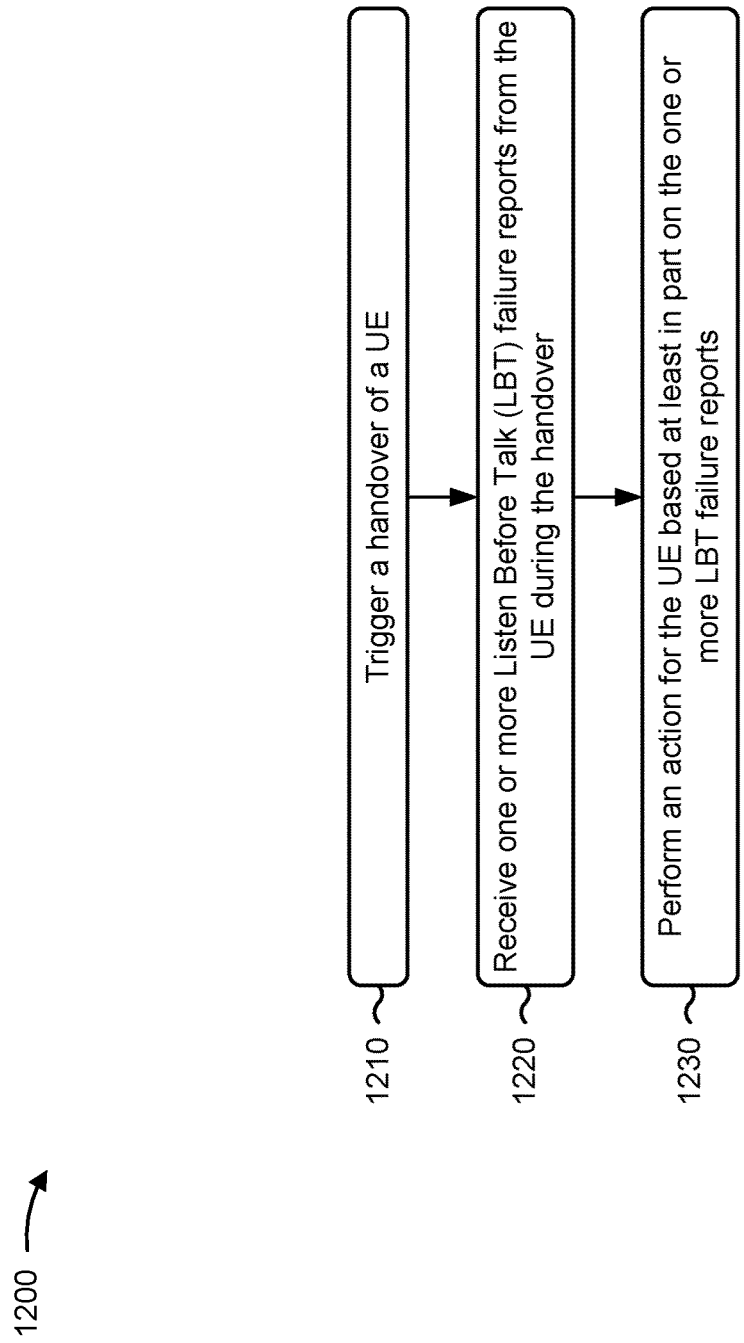
FIG. 12 is a diagram illustrating an example process performed, for example, by a base station.
Figure 13:
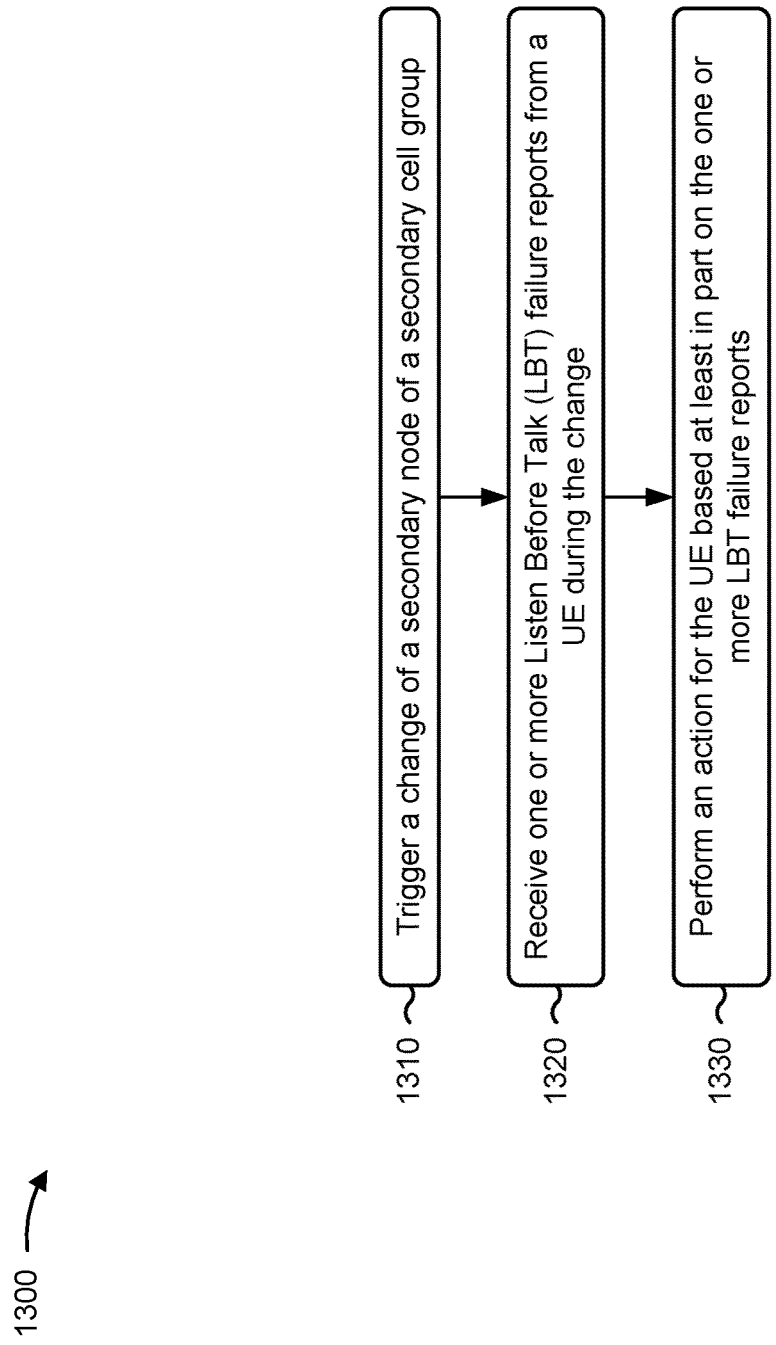
FIG. 13 is a diagram illustrating an example process performed, for example, by a base station.

The stored program codes, when executed by the controller/processor 280 or other processors and modules at the UE 120, may cause the UE 120 to perform operations described with respect to process 800 of FIG. 8, process 900 of FIG. 9, process 1000 of FIG. 10, process 1100 of FIG. 11, process 1200 of FIG. 12, process 1300 of FIG. 13, or other processes as described herein.

In some aspects, the UE 120 may include means for determining that a handover of the UE from a source cell to a target cell is triggered, where the source cell is an unlicensed source cell, and means for performing, during the handover, LBT on a channel of the source cell based on the determining and until a stopping condition occurs, or combinations thereof. In some aspects, such means may include one or more components of the UE 120 described in connection with FIG. 2.

In some aspects, the UE 120 may include means for determining that a handover of the UE from a source cell to a target cell is triggered, where the target cell is an unlicensed target cell, and means for performing, during the handover, LBT on a channel of the target cell, based on receiving a handover command message, or combinations thereof. In some aspects, such means may include one or more components of the UE 120 described in connection with FIG. 2.

In some aspects, the UE 120 may include means for determining that a handover of the UE from a source cell to a target cell is triggered and means for detecting, during the handover, one or more LBT failures on a downlink channel from one or more of the source cell or the target cell, or combinations thereof. In some aspects, such means may include one or more components of the UE 120 described in connection with FIG. 2.

In some aspects, the UE 120 may include means for determining that an SN change of the UE is triggered and means for performing, during the SN change, LBT on one or more of a channel of an unlicensed source secondary cell or a channel of an unlicensed target secondary cell, or combinations thereof. In some aspects, such means may include one or more components of the UE 120 described in connection with FIG. 2.

In some aspects, the base station 110 may include means for triggering a handover of a UE, means for receiving one or more LBT failure reports from the UE during the handover, means for performing an action for the UE based on the one or more LBT failure reports, or combinations thereof. In some aspects, such means may include one or more components of the base station 110 described in connection with FIG. 2.

In some aspects, the base station 110 may include means for triggering a change of an SN of a secondary cell group, means for receiving one or more LBT failure reports from a UE during the change, means for performing an action for the UE based on the one or more LBT failure reports, or combinations thereof. In some aspects, such means may include one or more components of the base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
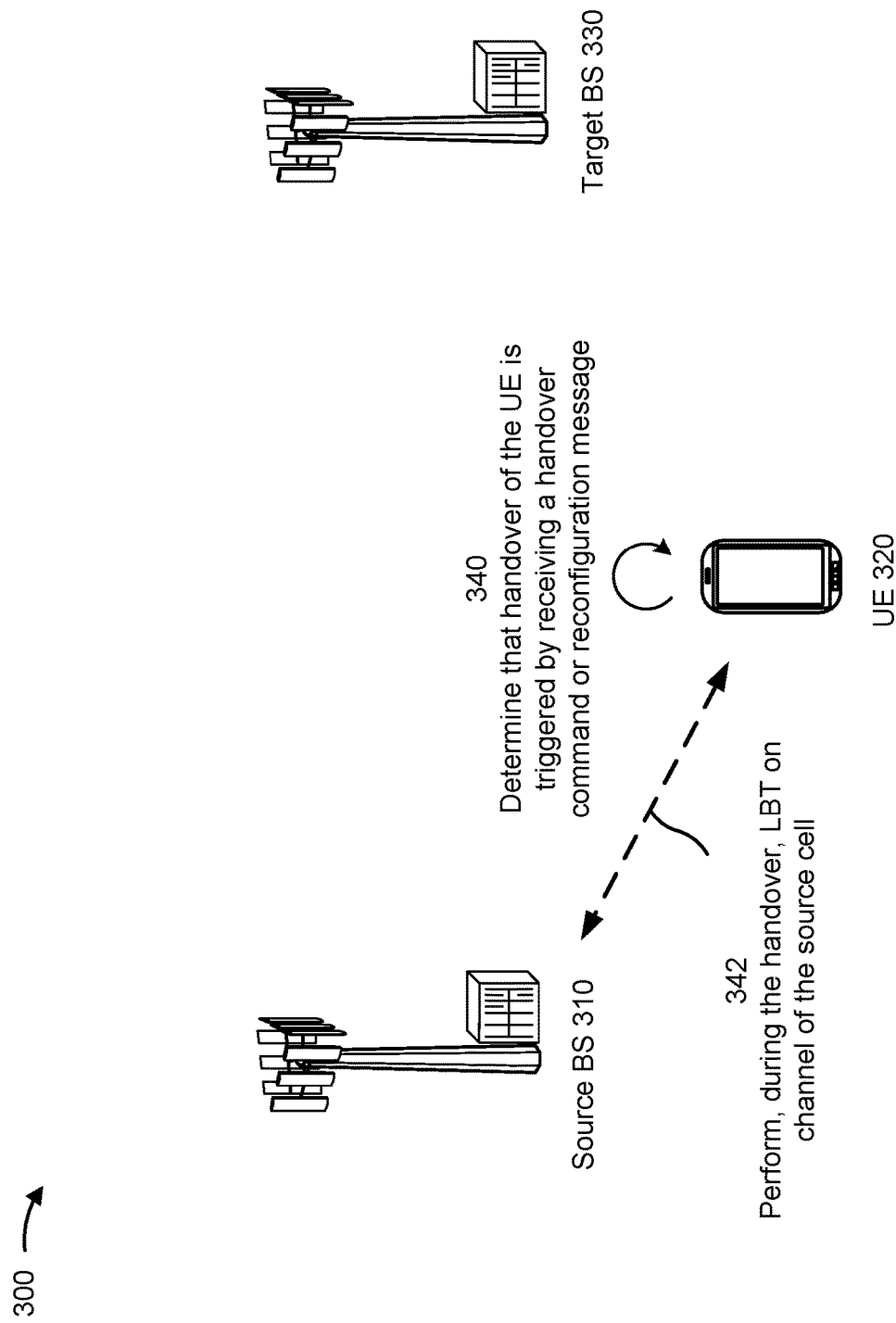
FIG. 3 is a diagram illustrating an example of a UE performing Listen Before Talk (LBT) during handover.

FIG. 3 is a diagram illustrating an example 300 of a UE performing LBT during handover. A source BS 310 (such as BS 110a-110d depicted and described in FIG. 1, and BS 110 depicted and described in FIG. 2) may provide a source cell for a UE 320 (such as UE 120a-120e depicted and described in FIG. 1, and UE 120 depicted and described in FIG. 2). The UE 320 may be handed over from the source cell to a target cell provided by a target BS 330 (such as BS 110a-110d and BS 110).

As shown by reference number 340, the UE 320 may determine that a handover is triggered. For example, the UE 320 may receive a handover command or reconfiguration message from the source BS 310. The source BS 310 may provide the message to the UE 320 after receiving a corresponding message from the target BS 330. In some aspects, the message from the source BS 310 may be related to causing a DAPS handover. In some aspects, the message may be related to causing a conditional handover, where the message may identify candidate target BSs and corresponding conditions that are to control when, and to which candidate target BSs, the UE 320 is to be handed over. Additionally, or alternatively, a handover may be triggered by a determination to perform measurements on signals for the source cell or on one or more target cells.

As shown by reference number 342, the UE 320 may perform, during the handover, LBT on a channel that the UE 320 may use to transmit uplink signals to the source BS 310 or receive downlink signals from the source BS 310. For example, if the source cell is an unlicensed source cell, the UE 320 may sense or listen for any signal power on a particular channel to or from the source BS 310. In some aspects, the UE 320 may perform LBT on a wideband channel (for example, greater than 20 MHz wide). A wideband channel may include multiple channels or sub-channels. In some aspects, such as for unlicensed millimeter wave (mmWave) bands, the UE 320 may use receive beam forming to listen to the channel from a specific direction. When the LBT has a successful result for a specific direction, the UE 320 may determine a set of beams to use the specific direction for transmission. Alternatively, during an LBT procedure, the UE 320 may perform a pseudo-omnidirectional LBT procedure to listen to the channel from multiple directions.

Figure 4:
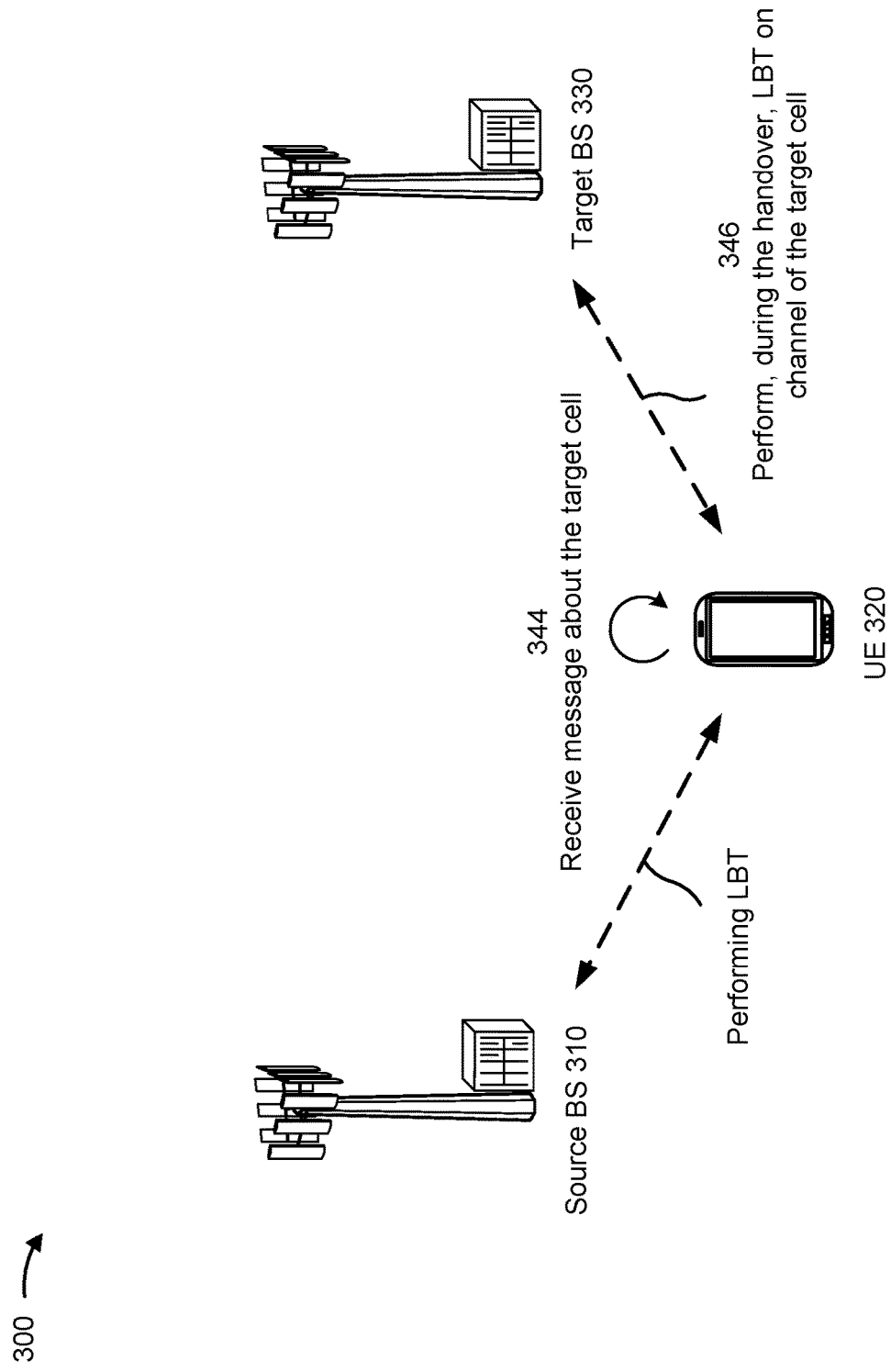
FIG. 4 is a diagram illustrating the example of the UE performing LBT during the handover.

FIG. 4 is a diagram illustrating example 300 of the UE 320 performing LBT during the handover. As shown by reference number 344, the UE 320 may receive a message about the target cell. The message may be a radio resource control (RRC) reconfiguration message or another message indicating a handover to the target BS 330. As shown by reference number 346, the UE 320 may perform, during the handover, LBT on a channel of the target cell, if the target cell is an unlicensed cell. The UE 320 may establish a target connection with the target cell before releasing a source connection with the source cell. This may provide uninterrupted service while the source connection is released. In some aspects, the UE 320 may perform LBT on a channel (or more than one channel) of the source cell at the same time as a channel (or more than one channel) of the target cell.

Figure 5:
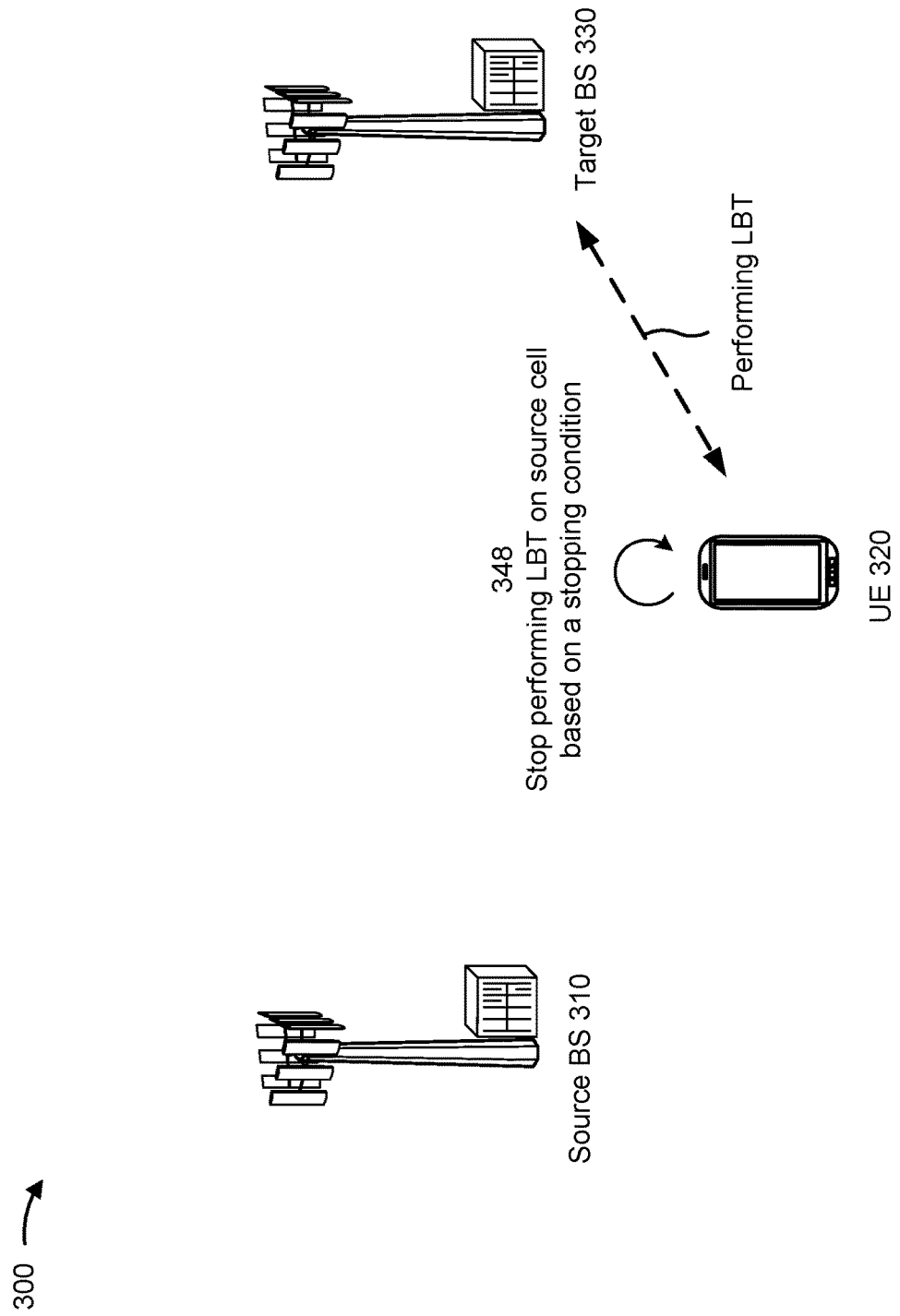
FIG. 5 is a diagram illustrating the example of the UE performing LBT during the handover.

FIG. 5 is a diagram illustrating the example 300 of the UE 320 performing LBT during the handover. As shown by reference number 348, the UE 320 may stop performing LBT on the channel of the source cell based on a stopping condition. The stopping condition may include receiving a release source message. The UE 320 may receive the release source message from the target cell. The UE 320 may release the source connection to the source cell. For example, the UE 320 may release the source connection after successfully accessing the target BS 330 and establishing a target connection with the target BS 330. If attempting access to the target BS 330 fails, then the UE 320 may maintain the source connection with the source cell.

In some aspects, the stopping condition may be completion of a random access channel (RACH) procedure at the target cell. The RACH procedure may be completed if the RACH procedure is successful in accessing the target cell.

While the UE 320 may stop performing LBT on the channel of the source cell, the UE 320 may continue performing LBT on the channel of the target cell. In some aspects, the UE 320 may perform LBT on the channel of the target cell as long as UE 320 maintains a target connection to the target cell.

Figure 6:
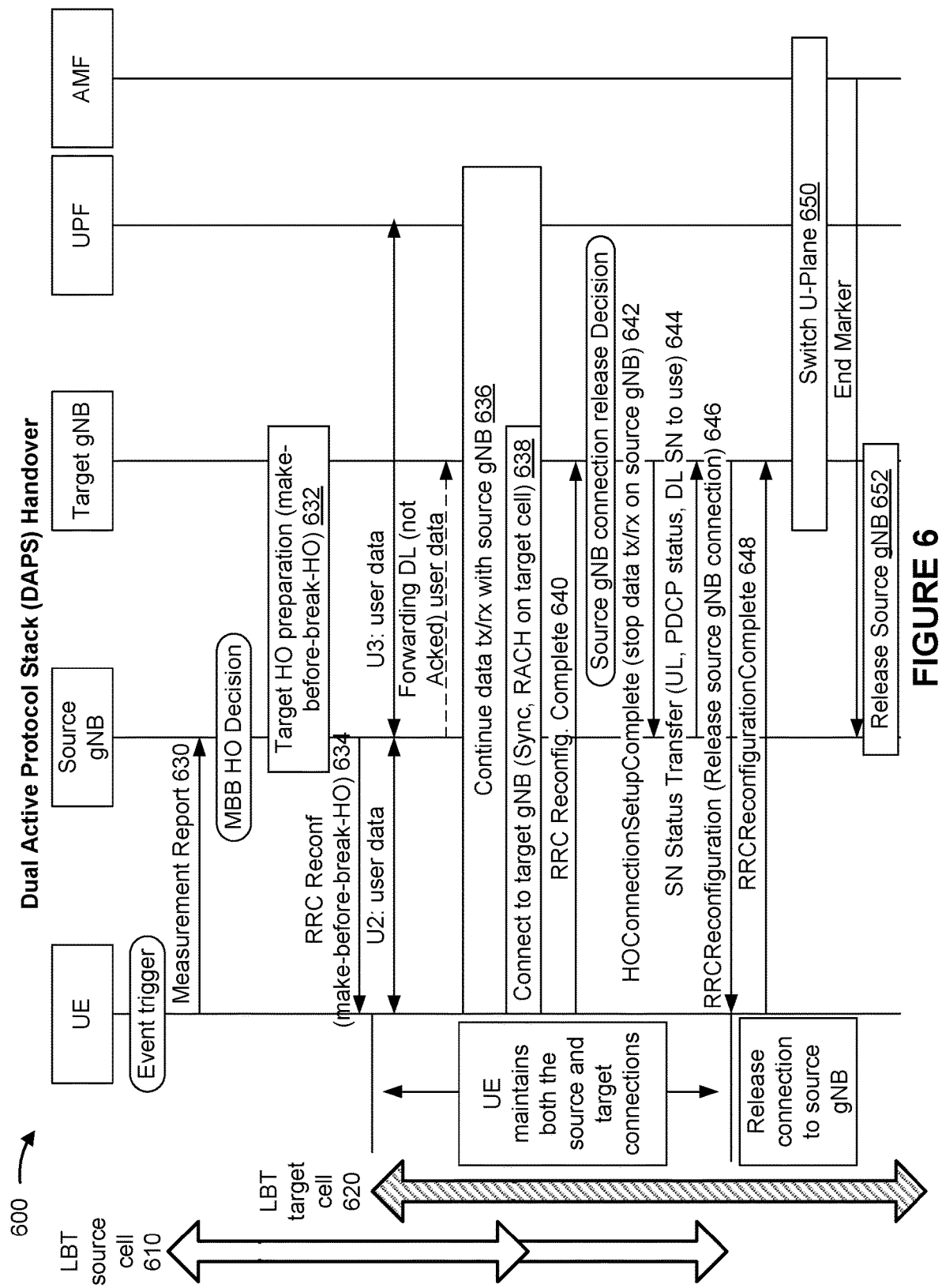
FIG. 6 is a diagram illustrating an example of a UE performing LBT during a DAPS handover.

FIG. 6 is a diagram illustrating an example 600 of a UE performing LBT during a DAPS handover. A source gNB (such as BS 110a-110d depicted and described in FIG. 1, BS 110 depicted and described in FIG. 2, or BS 310 depicted and described in FIG. 3) may provide a source cell for a UE (such as UE 120a-120e depicted and described in FIG. 1, UE 120 depicted and described in FIG. 2, or UE 320 depicted and described in FIG. 3). The UE may be handed over from the source cell to a target cell provided by a target gNB (such as BS 110a-110d, or BS 330 depicted and described in FIG. 3).

As shown by reference number 610, the UE may perform LBT on a channel of the source cell during the DAPS handover. As shown by reference number 620, the UE may perform LBT on a channel of the target cell during the DAPS handover. In some implementations, the UE may perform LBT on the channel of the source cell starting (or continuing) at a beginning of the DAPS handover and ending during the DAPS handover. The UE may perform LBT on the channel of the target cell starting during the DAPS handover and continuing after the DAPS handover. In some aspects, the UE may maintain both a source connection to the source gNB and a target connection to the target gNB for a portion of the DAPS handover.

The DAPS handover procedure may include several phases. The phases may include a handover preparation phase, a handover execution phase, and a handover completion phase. In some implementations, the UE may make and report measurements during the handover preparation phase. During the handover execution phase, the UE may execute the handover by performing a RACH procedure with the target gNB and establishing an RRC connection with the target gNB. During the handover completion phase, the source gNB may forward stored communications associated with the UE to the target gNB, and the UE may be released from the source connection to the source gNB.

The DAPS handover may involve multiple steps in the handover phases. After the UE determines that there is an event trigger, the UE may perform measurements (such as on signals of the source cell or neighboring cells) and transmit a measurement report to the source gNB of the source cell, as shown by reference number 630. The measurement report may indicate, for example, an RSRP parameter, an RSRQ parameter, an RSSI parameter, or a signal-to-interference-plus-noise-ratio (SINR) parameter. The UE may start or continue performing LBT based on the event trigger.

The source gNB may, based on the measurement report, decide to hand over the UE to the target gNB. As shown by reference number 632, the source gNB and the target gNB may prepare for a handover to the target gNB. The source gNB and the target gNB may communicate with one another to prepare for the DAPS handover. As part of the handover preparation, the source gNB may transmit a handover request to the target gNB to instruct the target gNB to prepare for the DAPS handover. The source gNB may transmit RRC context information associated with the UE or configuration information associated with the UE to the target gNB. The target gNB may prepare for the DAPS handover by reserving resources for the UE. After reserving the resources, the target gNB may transmit an acknowledgement (ACK) to the source gNB in response to the handover request.

As shown by reference number 634, the source gNB may provide an RRC reconfiguration message to the UE, initiating the DAPS handover. The RRC reconfiguration message may include a handover command instructing the UE to execute the DAPS handover from the source gNB to the target gNB. The handover command may include information associated with the target gNB, such as a RACH preamble assignment for accessing the target gNB. Reception of the RRC reconfiguration message, including the handover command, by the UE may trigger the start of the handover execution phase. At this point, the UE may start performing LBT on a channel of the target cell. The source gNB and the target gNB may exchange user data for the UE. U2 carries control information between the UE and the source gNB. U3 carries control and bearer information between the source gNB and the target gNB. User data may be passed along with U2 and U3. In some aspects, the UE may start performing LBT on the channel of the target cell as soon as the UE has identified the target gNB of the target cell.

The DAPS handover may involve transmission of data over a user plane function (UPF) using an access and mobility management function (AMF) device that controls the UPF. The UPF and the AMF device may be located within a core network. The source gNB and the target gNB may communicate with the core network for mobility support and user plane functions. The source gNB may forward some data to the target gNB. As shown by reference number 636, data reception and transmission may continue with the source gNB.

As shown by reference number 638, the UE may connect to the target gNB as part of the handover execution phase. The UE may connect to the target gNB by performing a RACH procedure with the target gNB. During this procedure, the UE may transmit uplink data, uplink control information, or an uplink reference signal (such as a sounding reference signal) to the source gNB, or may receive downlink data, downlink control information, or a downlink reference signal from the source gNB. While the UE is performing the RACH procedure with the target gNB, the UE may transmit uplink data, uplink control information, or an uplink reference signal (such as a sounding reference signal) to the source gNB, or may receive downlink data, downlink control information, or a downlink reference signal from the source gNB. Because the DAPS handover may be a make before break (MBB) handover, the UE may simultaneously maintain the source connection with the source gNB and the target connection with the target gNB.

Following completion of the RACH procedure on the target gNB, which may include synchronizing with the target gNB, the UE may stop performing LBT on the channel of the source cell. Alternatively, the UE may continue performing LBT on the channel of the source cell.

Upon successfully establishing a target connection with the target gNB (such as via the RACH procedure), the UE may transmit an RRC reconfiguration completion message to the target gNB, as shown by reference number 640. Reception of the RRC reconfiguration message by the target gNB may trigger the start of the handover completion phase. As a result, the target gNB may decide that the UE is to release the source connection. As shown by reference number 642, the target gNB may provide a handover connection setup complete message to the source gNB. The message may cause the source gNB to stop transmitting data to the UE or to stop receiving data from the UE. Additionally, or alternatively, the message may cause the source gNB to forward communications associated with the UE to the target gNB or to notify the target gNB of a status of one or more communications with the UE. For example, the source gNB may send, to the target gNB, buffered downlink communications (such as downlink data) for the UE or uplink communications (such as uplink data) received from the UE. As shown by reference number 644, the source gNB may notify the target gNB regarding a packet data convergence protocol (PDCP) status associated with the UE or a sequence number (SN) to be used for a downlink communication with the UE.

As shown by reference number 646, the target gNB may transmit an RRC reconfiguration message to the UE to instruct the UE to release the source connection to the source gNB. Upon receiving the instruction to release the source connection to the source gNB, the UE may stop communicating with the source gNB. For example, the UE may refrain from transmitting uplink communications to the source gNB or may refrain from monitoring for downlink communications from the source gNB. In some aspects, the UE may stop performing LBT on the one or more channels of the source cell based on receiving the RRC reconfiguration message.

As shown by reference number 648, the UE may transmit an RRC reconfiguration completion message to the target gNB to indicate that the connection between the source gNB and the UE is being released or has been released.

As shown by reference number 650, the target gNB, the UPF, or the AMF device may communicate to switch a user plane path of the UE from the source gNB to the target gNB. Prior to switching the user plane path, downlink communications for the UE may be routed through the core network to the source gNB. After the user plane path is switched, downlink communications for the UE may be routed through the core network to the target gNB. As shown by reference number 652, the source gNB and the target gNB may communicate to release the source gNB. In some aspects, the source gNB, the target gNB, or the UE may determine a performance parameter or other performance parameters after the DAPS handover. At this point, the UE may be performing LBT on the channel of the target cell.

Figure 7:
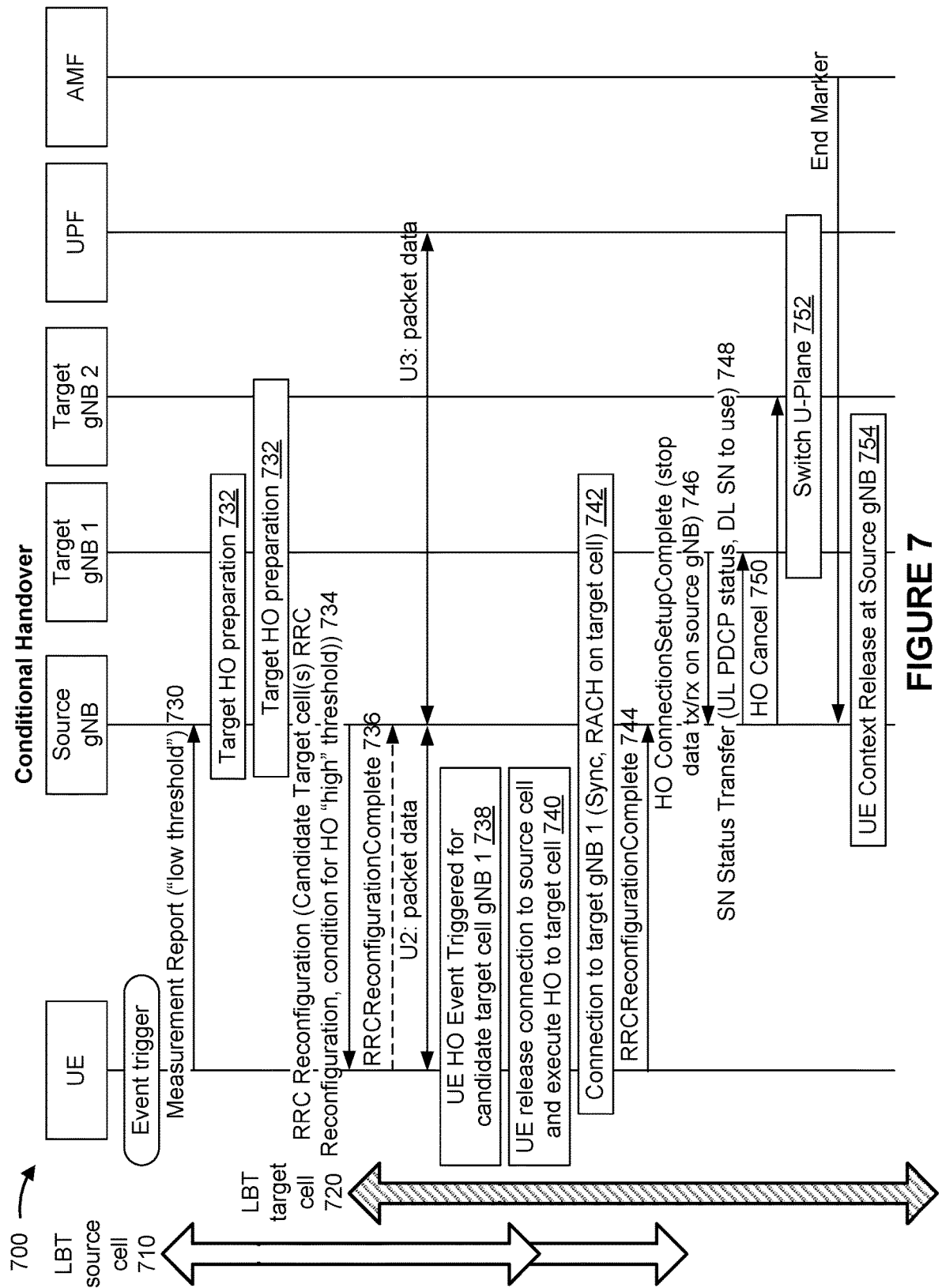
FIG. 7 is a diagram illustrating an example of a UE performing LBT during a conditional handover.

FIG. 7 is a diagram illustrating an example 700 of a UE performing LBT during a conditional handover. A source gNB (such as BS 110a-110d depicted and described in FIG. 1, BS 110 depicted and described in FIG. 2, or BS 310 depicted and described in FIG. 3) may provide a source cell for a UE (such as UE 120a-120e depicted and described in FIG. 1, UE 120 depicted and described in FIG. 2, or UE 320 depicted and described in FIG. 3). The UE may be handed over from the source cell to a candidate target cell provided by either the candidate target gNB 1 (such as BS 110a-110d, BS 110, or BS 330 depicted and described in FIG. 3) or the candidate target gNB 2 (such as BS 110 or BS 330).

As shown by reference number 710, the UE may perform LBT on a channel of the source cell during the conditional handover. As shown by reference number 720, the UE may perform LBT on a channel of the candidate target cell for the candidate target gNB 1 or the candidate target cell for the candidate target gNB 2 during the conditional handover. The UE may perform LBT on the channel of the source cell starting (or continuing) at a beginning of the handover and ending during the conditional handover. The UE may perform LBT on the channels of the candidate target cells starting during the conditional handover and continuing after the conditional handover. In some aspects, the UE may maintain both a source connection to the source cell and a target connection to the target cell for a portion of the conditional handover.

The conditional handover may involve multiple steps similar to those described in connection with FIG. 6, except that there may be multiple candidate target cells, and selection to a particular target cell of the candidate target cells may be based on a condition of the particular target cell being met.

After the UE determines that there is an event trigger, the UE may perform measurements (such as on signals of the source cell or neighboring cells) and transmit a measurement report to the source gNB of the source cell, as shown by reference number 730. The UE may begin or continue performing LBT based on the event trigger.

As shown by reference number 732, the source gNB and each candidate target gNB of the candidate target cells may prepare for a handover. As shown by reference number 734, the source gNB may transmit an RRC reconfiguration message to the UE, initiating the conditional handover. The RRC reconfiguration message may include a handover command instructing the UE to execute the conditional handover from the source gNB to one of the candidate target gNBs. The handover command may include information associated with each candidate target gNB, including a condition (such as a threshold) for a handover to a particular candidate target gNB (such as target gNB 1). At this point, the UE may start performing LBT on a channel of each of the candidate target cells. In some aspects, the UE may start performing LBT on the channels of the candidate target cells as soon as the UE has identified the candidate target gNBs of the target cells. The UE may simultaneously maintain the source connection to the source gNB and a target connection to the target gNB. As shown by reference number 736, the UE may transmit an RRC reconfiguration complete message to the source gNB. As described in connection with FIG. 6, the source gNB and the target gNB may exchange user data for the UE. U2 carries control information between the UE and the source gNB. U3 carries control and bearer information between the source gNB and the target gNB. User data may be passed along with U2 and U3.

As shown by reference number 738, the UE may determine that an event is triggered for handover to the target cell for the target gNB 1. As shown by reference number 740, the UE may release the source connection to the source cell and execute the conditional handover to the target gNB 1. At this point, the UE may stop performing LBT on the channel of the source cell. In some aspects, the UE may continue performing LBT on the channel of the source cell.

As shown by reference number 742, the UE may connect to the target gNB 1 as part of the handover execution phase. The UE may connect to the target gNB 1 by performing a RACH procedure with the target gNB 1.

Following completion of the RACH procedure with the target gNB 1, which may include synchronizing with the target gNB 1, the UE may stop performing LBT on the channel of the source cell. In some aspects, the UE may continue performing LBT on the channel of the source cell.

Upon successfully establishing a connection with the target gNB 1 (such as via the RACH procedure), the UE may transmit an RRC reconfiguration completion message to the target gNB 1, as shown by reference number 744. As shown by reference number 746, the target gNB 1 may transmit a handover connection setup complete message to the source gNB. Reception of the handover connection setup complete message by the target gNB 1 may trigger the source gNB to stop transmitting data to the UE or to stop receiving data from the UE. Additionally, or alternatively, the message may cause the source gNB to forward communications associated with the UE to the target gNB 1 or to notify the target gNB 1 of a status of one or more communications with the UE. As shown by reference number 748, the source gNB may notify the target gNB regarding a PDCP status associated with the UE or a serial number to be used for a downlink communication with the UE. In some aspects, the UE may stop performing LBT on the channel of the source cell.

As shown by reference number 750, the source gNB may transmit a handover cancel message to any candidate target gNBs that the UE did not select for handover. For example, the source gNB may transmit a handover cancel message to the target gNB 2.

As shown by reference number 752, the target gNB 1, the UPF, or the AMF device may communicate to switch a user plane path of the UE from the source gNB to the target gNB 1. Prior to switching the user plane path, downlink communications for the UE may be routed through the core network to the source gNB. After the user plane path is switched, downlink communications for the UE may be routed through the core network to the target gNB 1. As shown by reference number 754, the source gNB may release a UE context for the UE. At this point, the UE may be performing LBT on the channel of the target gNB 1.

In any of the scenarios described in connection with FIGS. 6 and 7, the UE may detect one or more LBT failures. The UE may detect an LBT failure when the channel of a cell is not clear. The UE may detect an LBT failure in an uplink or a downlink direction. The one or more LBT failures may include consistent (multiple) LBT failures on an uplink, or consistent LBT failures on a downlink. The one or more LBT failures may include LBT failures on both the uplink and downlink. For example, the UE may perform LBT and detect an LBT failure in the uplink direction due to the channel being busy. The UE also may detect an LBT failure in the downlink direction that is due to missed reference signals. In this scenario, the source cell or the target cell may be performing LBT. In some aspects, if the UE detects an LBT failure for the channel of the source cell, the UE may switch from one bandwidth part (BWP) at the source cell to another BWP of the source cell. Additionally, or alternatively, the UE may transmit a RACH message to the source cell. The UE may stop transmission or reception at the source cell. The UE may switch uplink data transmission to the target cell. The UE may report the LBT failure to the target cell.

In some aspects, if the handover is a conditional handover and the UE detects an LBT failure on the channel of a candidate target cell, the UE may stop conditional handover to the candidate target cell and attempt conditional handover to another candidate target cell.

In dual connectivity scenarios, an SN of a cell may be used with a primary node of a cell to increase a bandwidth or a performance for a UE. Traffic on the primary node and the SN may be aggregated. In such a scenario, the UE may change SNs. In some aspects, the change may be performed with operations comparable to a DAPS handover, a conditional handover, or another type of handover. That is, some of the operations described in connection with FIGS. 6 and 7 may apply to SN changes, even though the operations are described for primary nodes.

For example, if a source secondary cell is unlicensed, the UE may be performing LBT on a channel of the source secondary cell. The UE may decide to change from the source secondary cell to a target secondary cell. The UE may decide this change based on, for example, measurements from the source secondary cell or the target secondary cell. The UE may start performing LBT on a channel of the target secondary cell if the target secondary cell is unlicensed.

The UE may stop performing LBT on the channel of the source secondary cell based on a stopping condition. In some aspects, the stopping condition may be completing a RACH procedure at the target secondary cell. In some aspects, the stopping condition may be receiving a release source message from the target secondary cell.

In some aspects, if the UE detects LBT failure for the channel of the source secondary cell, the UE may switch a BWP at the source secondary cell, stop transmission to the source secondary cell, or switch uplink transmission to the target secondary cell. Additionally, or alternatively, the UE may transmit a RACH message to the source secondary cell. The UE may report the LBT failure to a primary cell associated with the source secondary cell.

FIG. 8 is a diagram illustrating an example process 800 performed, for example, by a UE. The process 800 is an example where a UE (for example, UE 120 depicted and described in FIGS. 1 and 2, UE 320 depicted and described in FIG. 3) performs LBT during handover.

As shown in FIG. 8, in some aspects, process 800 may include determining that a handover of the UE from a source cell to a target cell is triggered (block 810). For example, the UE (such as using controller/processor 280, transmit processor 264, TX MIMO processor 266, MOD 254, or antenna 252) may determine that a handover of the UE from a source cell to a target cell is triggered, as described above. In some aspects, the source cell is an unlicensed source cell.

As shown in FIG. 8, in some aspects, process 800 may include performing, during the handover, LBT on a channel of the source cell based on the determining and until a stopping condition occurs (block 820). For example, the UE (such as using controller/processor 280, transmit processor 264, TX MIMO processor 266, MOD 254, or antenna 252) may perform, during the handover, LBT on a channel of the source cell based on the determining and until a stopping condition occurs, as described above.

Process 800 may include additional aspects, such as any single aspect or any combination of aspects described below or in connection with one or more other processes described elsewhere herein.

In a first aspect, the stopping condition includes one or more of completing a random access channel procedure at the target cell or receiving a release source message from the target cell.

In a second aspect, alone or in combination with the first aspect, the target cell is an unlicensed target cell, and performing LBT during the handover includes performing LBT on a channel of the target cell, based on receiving a handover command message.

In a third aspect, alone or in combination with one or more of the first and second aspects, process 800 includes, based on detecting one or more LBT failures on a channel of the target cell, one or more of stopping the handover to the target cell, reporting the one or more LBT failures, or continuing with a connection to the source cell.

In a fourth aspect, alone or in combination with one or more of the first through third aspects, process 800 includes, based on detecting one or more LBT failures on the channel of the source cell, one or more of switching to another bandwidth part at the source cell, or transmitting a random access channel message to the target cell.

In a fifth aspect, alone or in combination with one or more of the first through fourth aspects, process 800 includes, based on detecting one or more LBT failures on the channel of the source cell, stopping transmission and reception at the source cell.

In a sixth aspect, alone or in combination with one or more of the first through fifth aspects, process 800 includes, based on detecting one or more LBT failures on the channel of the source cell, switching uplink data transmission to the target cell.

In a seventh aspect, alone or in combination with one or more of the first through sixth aspects, process 800 includes, based on detecting one or more LBT failures on the channel of the source cell, reporting the one or more LBT failures to the target cell.

In an eighth aspect, alone or in combination with one or more of the first through seventh aspects, the handover is a DAPS handover from the source cell to the target cell.

In a ninth aspect, alone or in combination with one or more of the first through eighth aspects, the handover is a conditional handover from the source cell to one of the target cell or another target cell.

In a tenth aspect, alone or in combination with one or more of the first through ninth aspects, the target cell is an unlicensed candidate target cell, and performing LBT during the handover includes performing LBT on a channel of the target cell and on a channel of another unlicensed candidate target cell, based on receiving a handover command message.

In an eleventh aspect, alone or in combination with one or more of the first through tenth aspects, process 800 includes, based on detecting one or more LBT failures on the channel of the target cell, stopping conditional handover to the target cell and attempting conditional handover to the other target cell.

In a twelfth aspect, alone or in combination with one or more of the first through eleventh aspects, process 800 includes, based on detecting one or more LBT failures on the channel of the target cell, one or more of switching to another bandwidth part at the target cell.

In a thirteenth aspect, alone or in combination with one or more of the first through twelfth aspects, process 800 includes, based on detecting one or more LBT failures on the channel of the target cell, reporting the one or more LBT failures to the source cell or to the other target cell.

In a fourteenth aspect, alone or in combination with one or more of the first through thirteenth aspects, the channel is an uplink channel.

In a fifteenth aspect, alone or in combination with one or more of the first through fourteenth aspects, the channel is a downlink channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE. The process 900 is an example where UE (for example, UE 120 depicted and described in FIGS. 1 and 2, UE 320 depicted and described in FIG. 3) performs LBT during handover.

As shown in FIG. 9, in some aspects, process 900 may include determining that a handover of the UE from a source cell to a target cell is triggered (block 910). For example, the UE (such as using controller/processor 280, transmit processor 264, TX MIMO processor 266, MOD 254, or antenna 252) may determine that a handover of the UE from a source cell to a target cell is triggered, as described above. In some aspects, the target cell is an unlicensed target cell.

As shown in FIG. 9, in some aspects, process 900 may include performing, during the handover, LBT on a channel of the target cell, based on receiving a handover command message (block 920). For example, the UE (such as using controller/processor 280, transmit processor 264, TX MIMO processor 266, MOD 254, or antenna 252) may perform, during the handover, LBT on a channel of the target cell, based on receiving a handover command message, as described above.

Process 900 may include additional aspects, such as any single aspect or any combination of aspects described below or in connection with one or more other processes described elsewhere herein.

In a first aspect, process 900 includes, based on detecting one or more LBT failures on a channel of the target cell, at least one of stopping the handover to the target cell, reporting the one or more LBT failures, or continuing with a connection to the source cell.

In a second aspect, alone or in combination with the first aspect, the handover is a DAPS handover from the source cell to the target cell.

In a third aspect, alone or in combination with one or more of the first and second aspects, the handover is a conditional handover from the source cell to one of the target cell or another target cell.

In a fourth aspect, alone or in combination with one or more of the first through third aspects, performing LBT during the handover includes performing LBT on a channel of the target cell and on a channel of another unlicensed candidate target cell, based on receiving a handover command message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE. The process 800 is an example where a UE (for example, UE 120 depicted and described in FIGS. 1 and 2, UE 320 depicted and described in FIG. 3) detects LBT failures during handover.

As shown in FIG. 10, in some aspects, process 1000 may include determining that a handover of the UE from a source cell to a target cell is triggered (block 1010). For example, the UE (such as using controller/processor 280, transmit processor 264, TX MIMO processor 266, MOD 254, or antenna 252) may determine that a handover of the UE from a source cell to a target cell is triggered, as described above.

As shown in FIG. 10, in some aspects, process 1000 may include detecting, during the handover, one or more LBT failures on a downlink channel from one or more of the source cell or the target cell (block 1020). For example, the UE (such as using controller/processor 280, transmit processor 264, TX MIMO processor 266, MOD 254, or antenna 252) may detect, during the handover, one or more LBT failures on a downlink channel from one or more of the source cell or the target cell, as described above.

Process 1000 may include additional aspects, such as any single aspect or any combination of aspects described below or in connection with one or more other processes described elsewhere herein.

In a first aspect, detecting the one or more LBT failures includes detecting that one or more reference signals are not received from the one or more of the target cell or the source cell.

In a second aspect, alone or in combination with the first aspect, process 1000 includes, based on detecting the one or more LBT failures on a channel of the source cell, one or more switching to another bandwidth part at the source cell, transmitting a random access channel message to the target cell, stopping transmission and reception at the source cell, or switching uplink data transmission to the target cell.

In a third aspect, alone or in combination with one or more of the first and second aspects, process 1000 includes, based on detecting the one or more LBT failures on a channel of the target cell, one or more of stopping the handover to the target cell, reporting the one or more LBT failures, or continuing with a connection to the source cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE. The process 1100 is an example where UE (for example, UE 120 depicted and described in FIGS. 1 and 2, UE 320 depicted and described in FIG. 3) performs LBT during an SN change.

As shown in FIG. 11, in some aspects, process 1100 may include determining that an SN change of the UE is triggered (block 1110). For example, the UE (such as using controller/processor 280, transmit processor 264, TX MIMO processor 266, MOD 254, or antenna 252) may determine that an SN change of the UE is triggered, as described above.

As shown in FIG. 11, in some aspects, process 1100 may include performing, during the SN change, LBT on one or more of a channel of an unlicensed source secondary cell or a channel of an unlicensed target secondary cell (block 1120). For example, the UE (such as using controller/processor 280, transmit processor 264, TX MIMO processor 266, MOD 254, or antenna 252) may perform, during the SN change, LBT on one or more of a channel of an unlicensed source secondary cell or a channel of an unlicensed target secondary cell, as described above.

Process 1100 may include additional aspects, such as any single aspect or any combination of aspects described below or in connection with one or more other processes described elsewhere herein.

In a first aspect, performing LBT during the SN change includes performing LBT on the channel of the unlicensed source secondary cell based on the determining and until a stopping condition occurs.

In a second aspect, alone or in combination with the first aspect, the stopping condition includes one or more of completing a random access channel procedure at the unlicensed target secondary cell or receiving a release source message from the unlicensed target secondary cell.

In a third aspect, alone or in combination with one or more of the first and second aspects, process 1100 includes, based on detecting one or more LBT failures on the channel of the unlicensed source secondary cell, one or more of switching to another bandwidth part at the unlicensed source secondary cell, transmitting a random access channel message to the unlicensed target secondary cell, or reporting the one or more LBT failures to an associated primary cell.

In a fourth aspect, alone or in combination with one or more of the first through third aspects, performing LBT during the SN change includes performing LBT on the channel of the unlicensed target secondary cell, based on receiving an SN change message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station. The process 1200 is an example where the base station (for example, base station 110 depicted and described in FIGS. 1 and 2, BS 310 or BS 330 depicted and described in FIG. 3) receives LBT failure reports during a handover.

As shown in FIG. 12, in some aspects, the process 1200 may include triggering a handover of a UE (block 1210). For example, the base station (such as using controller/processor 240, transmit processor 220, TX MIMO processor 230, MOD 232, or antenna 234) may trigger a handover of a UE, as described above.

As shown in FIG. 12, in some aspects, the process 1200 may include receiving one or more LBT failure reports from the UE during the handover (block 1220). For example, the base station (such as using controller/processor 240, transmit processor 220, TX MIMO processor 230, MOD 232, or antenna 234) may receive one or more LBT failure reports from the UE during the handover, as described above.

As shown in FIG. 12, in some aspects, the process 1200 may include performing an action for the UE based on the one or more LBT failure reports (block 1230). For example, the base station (such as using controller/processor 240, transmit processor 220, TX MIMO processor 230, MOD 232, or antenna 234) may perform an action for the UE based on the one or more LBT failure reports, as described above.

The process 1200 may include additional aspects, such as any single aspect or any combination of aspects described below or in connection with one or more other processes described elsewhere herein.

In a first additional aspect, performing the action includes dropping a source cell or a target cell for the UE.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

FIG. 13 is a diagram illustrating an example process 1300 performed, for example, by a base station. The process 1300 is an example where the base station (for example, base station 110 depicted and described in FIGS. 1 and 2, BS 310 or BS 330 depicted and described in FIG. 3) receives LBT failure reports during an SN change.

As shown in FIG. 13, in some aspects, the process 1300 may include triggering a change of an SN of a secondary cell group (block 1310). For example, the base station (such as using controller/processor 240, transmit processor 220, TX MIMO processor 230, MOD 232, or antenna 234) may trigger a change of an SN of a secondary cell group, as described above.

As shown in FIG. 13, in some aspects, the process 1300 may include receiving one or more LBT failure reports from a UE during the change (block 1320). For example, the base station (such as using controller/processor 240, transmit processor 220, TX MIMO processor 230, MOD 232, or antenna 234) may receive one or more LBT failure reports from a UE during the change, as described above.

As shown in FIG. 13, in some aspects, the process 1300 may include performing an action for the UE based on the one or more LBT failure reports (block 1330). For example, the base station (such as using controller/processor 240, transmit processor 220, TX MIMO processor 230, MOD 232, or antenna 234) may perform an action for the UE based on the one or more LBT failure reports, as described above.

The process 1300 may include additional aspects, such as any single aspect or any combination of aspects described below or in connection with one or more other processes described elsewhere herein.

In a first additional aspect, performing the action includes dropping a secondary cell for the UE.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   receiving a message including information associated with a handover of the UE from a source cell to a target cell; and
   performing, during the handover, Listen Before Talk (LBT) on a channel of the source cell after receiving the message and until a stopping condition occurs,
      wherein LBT is performed on a channel of the target cell during the handover based on receiving the message.

2. The method of claim 1, wherein the stopping condition includes completing a random access channel procedure at the target cell.

3. The method of claim 1, further comprising, based on detecting one or more LBT failures on the channel of the target cell, one or more of stopping the handover to the target cell, reporting the one or more LBT failures, or continuing with a connection to the source cell.

4. The method of claim 1, further comprising, based on detecting one or more LBT failures on the channel of the source cell, switching to another bandwidth part at the source cell and transmitting a random access channel message.

5. The method of claim 1, further comprising, based on detecting one or more LBT failures on the channel of the source cell, stopping transmission and reception at the source cell.

6. The method of claim 1, further comprising, based on detecting one or more LBT failures on the channel of the source cell, reporting the one or more LBT failures to the target cell.

7. The method of claim 1, wherein the handover is a dual active protocol stack (DAPS) handover from the source cell to the target cell.

8. The method of claim 1, wherein the handover is a conditional handover from the source cell to the target cell.

9. The method of claim 8, further comprising, based on detecting one or more LBT failures on the channel of the target cell, one of: switching to another bandwidth part at the target cell, or stopping the conditional handover to the target cell and attempting conditional handover to another target cell.

10. The method of claim 8, further comprising, based on detecting one or more LBT failures on the channel of the target cell, reporting the one or more LBT failures to the source cell or to another target cell.

11. The method of claim 1, wherein the channel of the source cell is an uplink channel.

12. The method of claim 1, wherein the channel of the source cell is a downlink channel.

13. The method of claim 1, wherein the stopping condition includes an event that triggers execution of a conditional handover to the target cell.

14. The method of claim 1, wherein the stopping condition occurs after starting LBT on the channel of the target cell.

15. A method of wireless communication performed by an apparatus of a user equipment (UE), comprising:
   determining that a secondary node (SN) change of the UE is triggered; and
   performing, during the SN change, Listen Before Talk (LBT) on one or more of a channel of an unlicensed source secondary cell or a channel of an unlicensed target secondary cell.

16. The method of claim 15, wherein performing LBT during the SN change includes performing LBT on the channel of the unlicensed source secondary cell based on the determining and until a stopping condition occurs.

17. The method of claim 16, wherein the stopping condition includes one or more of completing a random access channel procedure at the unlicensed target secondary cell or receiving a release source message from the unlicensed target secondary cell.

18. The method of claim 16, further comprising, based on detecting one or more LBT failures on the channel of the unlicensed source secondary cell, one or more of switching to another bandwidth part at the unlicensed source secondary cell, transmitting a random access channel message to the unlicensed target secondary cell, or reporting the one or more LBT failures to an associated primary cell.

19. The method of claim 15, wherein performing LBT during the SN change includes performing LBT on the channel of the unlicensed target secondary cell, based on receiving an SN change message.

20. An apparatus of a user equipment (UE) for wireless communication, comprising:
   a processing system configured to:
      receive a message including information associated with a handover of the UE from a source cell to a target cell; and
      perform, during the handover, Listen Before Talk (LBT) on a channel of the source cell after receiving the message and until a stopping condition occurs, wherein LBT is performed on a channel of the target cell during the handover based on receiving the message.

21. The apparatus of claim 20, wherein the processing system is further configured to, based on detecting one or more LBT failures on a channel of the target cell, one or more of stop the handover to the target cell, report the one or more LBT failures, or continue with a connection to the source cell.

22. The apparatus of claim 20, wherein the processing system is further configured to, based on detecting one or more LBT failures on the channel of the source cell, one or more of switch to another bandwidth part at the source cell, or output a random access channel message.

23. The apparatus of claim 20, wherein the processing system is further configured to, based on detecting one or more LBT failures on the channel of the source cell, stop transmission and reception at the source cell.

24. The apparatus of claim 20, wherein the processing system is further configured to, based on detecting one or more LBT failures on the channel of the source cell, report the one or more LBT failures to the target cell.

25. The apparatus of claim 20, wherein the handover is a dual active protocol stack (DAPS) handover from the source cell to the target cell.

26. The apparatus of claim 20, wherein the handover is a conditional handover from the source cell to the target cell.

27. The apparatus of claim 26, wherein the processing system is further configured to, based on detecting one or more LBT failures on the channel of the target cell, report the one or more LBT failures to the source cell or to another target cell.

28. The apparatus of claim 20, wherein the stopping condition includes completing a random access channel procedure at the target cell.

29. The apparatus of claim 20, wherein the channel of the source cell is an uplink channel.

30. The apparatus of claim 20, wherein the stopping condition includes an event that triggers execution of a conditional handover to the target cell.

31. The apparatus of claim 20, wherein the stopping condition occurs after starting LBT on the channel of the target cell.

32. An apparatus of a user equipment (UE) for wireless communication, comprising:
   a processing system configured to:
      determine that a secondary node (SN) change of the UE is triggered; and
      perform, during the SN change, Listen Before Talk (LBT) on one or more of a channel of an unlicensed source secondary cell or a channel of an unlicensed target secondary cell.

33. The apparatus of claim 32, wherein the processing system is further configured to perform LBT on the channel of the unlicensed source secondary cell based on the determining and until a stopping condition occurs.

34. The apparatus of claim 33, wherein the processing system is further configured to, based on detecting one or more LBT failures on the channel of the unlicensed source secondary cell, one or more of switch to another bandwidth part at the unlicensed source secondary cell, transmit a random access channel message to the unlicensed target secondary cell, or report the one or more LBT failures to an associated primary cell.

35. The apparatus of claim 32, wherein the processing system is further configured to perform LBT on the channel of the unlicensed target secondary cell, based on obtaining an SN change message.

* * * * *